US012722904B1

(12) United States Patent
Parks et al.

(10) Patent No.: US 12,722,904 B1
(45) Date of Patent: Sep. 1, 2026

(54) CONVEYOR BIDIRECTIONAL ROLLER ASSEMBLY AND CONVEYOR THEREWITH

(71) Applicant: ROACH MANUFACTURING CORPORATION, Trumann, AR (US)

(72) Inventors: Michael R. Parks, Trumann, AR (US); Christopher E. Kain, Tyronza, AR (US)

(73) Assignee: Roach Manufacturing Corporation, Trumann, AK (US)

( * ) Notice: Subject to any disclaimer, the term of this patent is extended or adjusted under 35 U.S.C. 154(b) by 0 days.

(21) Appl. No.: 19/539,788

(22) Filed: Feb. 13, 2026

Related U.S. Application Data

(60) Provisional application No. 63/843,568, filed on Jul. 14, 2025.

(51) Int. Cl.
*B65G 39/12* (2006.01)
*B65G 13/07* (2006.01)
*B65G 39/09* (2006.01)
*B65G 13/10* (2006.01)

(52) U.S. Cl.
CPC ............. *B65G 39/12* (2013.01); *B65G 13/07* (2013.01); *B65G 39/09* (2013.01); *B65G 13/10* (2013.01); *B65G 2207/34* (2013.01)

(58) Field of Classification Search
CPC ...... B65G 13/04; B65G 13/07; B65G 13/071; B65G 13/10; B65G 13/11; B65G 39/025; B65G 39/04; B65G 39/09; B65G 39/12; B65G 39/14; B65G 2207/34
USPC ...................................................... 193/35 MD
See application file for complete search history.

(56) References Cited

U.S. PATENT DOCUMENTS 3,363,735 A * 1/1968 Hotchkiss .............. B65G 13/10 193/37
3,964,588 A * 6/1976 Kornylak ............. B65G 47/766 198/786
5,039,269 A * 8/1991 Yen ........................ B65G 13/10 414/239
5,404,984 A * 4/1995 Hagman ................ B65G 39/02 193/35 MD
5,421,442 A * 6/1995 Agnoff ................... B65G 39/12 193/35 R
6,053,298 A * 4/2000 Nimmo .................. B65G 39/12 193/37

(Continued)

*Primary Examiner* — Gene O Crawford
*Assistant Examiner* — Keith R Campbell
(74) *Attorney, Agent, or Firm* — Dunlap Bennett & Ludwig PLLC

(57) ABSTRACT

A repositionable bidirectional roller assembly for conveyors includes bidirectional wheels that enable the diversion of conveyed items from the conveyor in a diversion direction different from the transport direction of the conveyor. The repositionable bidirectional roller assembly includes a plurality of bidirectional wheels that rotate in the diversion direction, and a hub assembly at each end having a reversibly compressible shaft which enables the bidirectional roller assembly to be easily inserted into, and removed from, an existing conveyor. By virtue of the reversibly compressible hub assembly shaft, operational flexibility is provided, since any bidirectional roller assembly can easily be removed from a given position and reinserted in the conveyor at a desired different position, thus enabling the diversion of conveyed items to be attained at any point along the conveyor length.

24 Claims, 48 Drawing Sheets

(56) References Cited

U.S. PATENT DOCUMENTS

| | | | | |
|---|---|---|---|---|
| 6,702,091 | B2 * | 3/2004 | Nimmo | B65G 39/12 193/35 R |
| 8,672,116 | B2 * | 3/2014 | Calloway | B65G 39/09 193/35 R |
| 10,472,179 | B2 * | 11/2019 | Guerra | F16C 19/54 |
| 12,351,397 | B2 * | 7/2025 | Wetters | B65G 13/10 |
| 12,391,488 | B1 * | 8/2025 | Langstaff | B65G 39/06 |
| 12,497,242 | B2 * | 12/2025 | Crowder, Jr. | B65G 13/00 |

* cited by examiner

CONVEYOR BIDIRECTIONAL ROLLER ASSEMBLY AND CONVEYOR THEREWITH

CROSS-REFERENCE TO RELATED APPLICATIONS

This application is related to and claims benefit of priority to U.S. Provisional Application for Patent No. 63/843,568 filed Jul. 14, 2025.

BACKGROUND OF THE INVENTION

1. Field of the Invention

The present invention relates to conveyors that receive and convey multiple packages, containers, and parcels ("conveyed items"). More specifically, the invention relates to a band driven roller conveyor that includes both unidirectional rollers and bidirectional rollers. A function of the bidirectional rollers is to enable the easy diversion of conveyed items from the conveyor in a direction that is different from that of the transport direction of the conveyor.

2. Description of Related Art

Conveyors having unidirectional rollers are conventionally used to convey or transport items such as parcels of product in warehouses, manufacturing facilities, and other locations. Typically, such facilities employ a conveyor distribution system that receives the conveyed items for transport to a different location within the facility or location. However, for various reasons, it is oftentimes desirable to divert certain conveyed items from the unidirectional roller conveyor in a direction that is different from that of the transport direction of the conveyor.

One typical prior art approach to diverting the conveyed items from the unidirectional roller conveyor is performed by operators at the facility, who, standing alongside the conveyor, manually push the conveyed items to be diverted off the far side of the conveyor. More specifically, as described and illustrated in greater detail herein, an operator must manually push the conveyed item across the axial length of rotating unidirectional roller assemblies and over the frame on the far side (i.e., the side away from the operator) of the conveyor, oftentimes into a chute, into a hopper, onto a table, or onto another conveyor, etc. However, the effort associated with pushing the packages across the rotating unidirectional rollers can be substantial, and thus difficult for an operator to do for extended periods of time. In addition, there may be safety concerns for the operator associated with reaching across the rotating unidirectional rollers.

Another issue associated with a prior art unidirectional roller conveyor is the following. Typically, a unidirectional roller assembly includes bearings associated with the roller shaft, which enable the unidirectional roller to rotate, while the roller shaft itself remains stationary. And typically, a unidirectional roller assembly has at least one spring-actuated end, which enables the assembly to easily be removed from the conveyor frame, such as for replacement or repair. If, in order to divert conveyed items from the unidirectional conveyor, one might attempt to adapt a prior art unidirectional roller assembly to include bidirectional wheels on the roller shaft. However, a drawback associated with such an approach is that because, as noted above, the roller shaft itself remains stationary, the result would be bidirectional wheels that are not driven, i.e., do not rotate, during normal transport without diversion.

In an effort to address the above-described issues with diversion of conveyed items from a unidirectional roller conveyor, one prior art solution is to replace the unidirectional roller conveyor with a transverse roller top belt conveyor. The transverse roller top belt conveyor is, as its name implies, a continuous belt conveyor that has within the belt a plurality of rows, each row containing a plurality of small transverse rollers, i.e., small unidirectional wheels. That is, wheels that rotate only in a direction transverse to the transport direction of the belt.

However, the use of a transverse roller top belt conveyor is not a desirable option for at least several reasons. First, transverse roller top conveyors are expensive, relative to a unidirectional roller conveyor. Second, one typically must remove an existing unidirectional roller conveyor and install the transverse roller top conveyor in its place, which necessitates incurring the expense associated with the removal and the subsequent installation. And third, the diversion station is limited to the installed location because once installed, it is expensive to remove the transverse roller top conveyor, move it to a new location, and reinstall it in the system. In short, there is a lack of flexibility associated with a transverse roller top conveyor.

Another prior art approach is to modify a unidirectional roller conveyor by separating that conveyor so as to position therewithin a conveyor section having a plurality of undriven bidirectional wheels. However, drawbacks of this approach include those associated with the above-described transverse roller top conveyor, i.e., incurring the expense associated with removal of the unidirectional roller conveyor section and the subsequent installation of the section having the undriven bidirectional wheels. And, the diversion station is limited to the installed location because once installed, it is expensive to remove the undriven bidirectional wheels section, move it to a new location, and reinstall it in the system. Furthermore, because the bidirectional wheels are undriven, there is some loss of conveying efficiency in the transport direction. In short, there are deficiencies associated with the use of an undriven bidirectional wheels section.

And, still another prior art approach is to modify a unidirectional roller conveyor by separating that conveyor so as to position therewithin a conveyor section having driven bidirectional wheels. However, drawbacks of this approach include many of those associated with the above-described transverse roller top conveyor and undriven bidirectional wheels section, i.e., incurring the expense associated with removal of the unidirectional roller conveyor section and the subsequent installation of the section having the driven bidirectional wheels. And, the diversion station is limited to the installed location because once installed, it is expensive to remove the driven bidirectional wheels section, move it to a new location, and reinstall it in the system. In short, there are also deficiencies associated with the use of a driven bidirectional wheels section.

Accordingly, a need exists for a roller conveyor that can easily, safely, flexibly, and economically facilitate the diversion of certain conveyed items from the conveyor in a direction that is different from that of the transport direction of the conveyor.

SUMMARY OF THE INVENTION

In order to overcome the above-described drawbacks associated with the prior art conveying devices, it is therefore an object of the present invention to provide a roller conveyor that can easily, safely, flexibly, and economically facilitate the diversion of certain conveyed items from the conveyor in a direction that is different from that of the transport direction of the conveyor.

More specifically, it is an object of the present invention to be able to reconfigure a prior art unidirectional roller conveyor to include a section of bidirectional roller assemblies that facilitate the diversion of conveyed items therefrom, preferably in a diversion direction that is perpendicular or substantially perpendicular to the transport direction of the conveyor.

It is another object of the present invention to be able to directly replace a unidirectional roller assembly with a bidirectional roller assembly in an existing unidirectional roller conveyor without otherwise modifying the conveyor.

It is still another object of the present invention to be able to replace a unidirectional roller assembly with a bidirectional roller assembly that is easily inserted into the conveyor frame, and easily removed therefrom, so as to provide operational flexibility.

It is another object of the present invention to be able to insert a bidirectional roller assembly having a plurality of bidirectional wheels configured to provide rotation for transport of a conveyed item in a conveyor transport direction, and to provide rotation for transport of a conveyed item in a diversion direction.

It is yet another object of the present invention to be able to insert a bidirectional roller assembly having a plurality of bidirectional wheels that not only rotate in a diversion direction but that also are driven by drive bands so as to rotate in the transport direction of the conveyor.

It is still another object of the present invention to be able to easily configure a bidirectional roller assembly with various numbers and spacings of bidirectional wheels on any one assembly, and to easily configure a spacing between adjacent assemblies.

And, it is yet another object of the present invention to have a method of easily and quickly reconfiguring a prior art unidirectional roller conveyor to include a section of bidirectional roller assemblies that facilitate the diversion of conveyed items therefrom, preferably in a diversion direction that is perpendicular or substantially perpendicular to the transport direction of the conveyor.

With the foregoing and other objects in mind, the present invention advantageously relates in general to a novel repositionable bidirectional roller assembly. The repositionable bidirectional roller assembly according to the present invention provides an easily assembled, easily reconfigured, and easily repositionable roller assembly, or entire sections of a plurality of bidirectional roller assemblies.

A primary aspect of the present repositionable bidirectional roller assembly is that it provides the ability to directly replace a unidirectional roller assembly in an existing conveyor without modification of the conveyor. This advantageous aspect is made possible by a first feature of the invention, which is a hub assembly that has a reversibly compressible hub shaft. More specifically, according to one embodiment, the hub assembly includes the reversibly compressible hub shaft, a spring which functions to return the hub shaft to an extended, i.e., non-compressed, original position, a bearing which supports a first end of the hub shaft and a bearing to support a second end of the hub shaft. The compressibility of either one or both of the hub shafts enables the bidirectional roller assembly to easily be inserted into, and removed from, an existing unidirectional conveyor. By virtue of the reversibly compressible hub shafts, the invention provides operational flexibility, since any bidirectional roller assembly can easily be removed from a given position and reinserted in the conveyor at a desired different position, thus enabling the diversion of conveyed items to be attained at any point along the length of the conveyor.

In another aspect of the present invention, the above-described bidirectional roller assembly having a plurality of bidirectional wheels provides rotation for transport of a conveyed item in a conveyor transport direction, and provides rotation for transport of a conveyed item in a diversion direction.

In still another aspect of the present invention, the above-described hub assembly provides the hubs, shafts, and bidirectional wheels with the ability to rotate when driven by drive bands. More specifically, each threaded end of a roller shaft is threadably connected to a correspondingly threaded section of a respective hub assembly. This means that as the hub assemblies are driven to rotate, the roller shaft is similarly driven to rotate, as are the bidirectional wheels mounted on the roller shaft. This feature is beneficial because the bidirectional roller section of the conveyor is thus able to convey along the transport direction of the conveyor when diversion from the conveyor is not desired. In other words, the rotatable feature of the bidirectional rollers ensures that there is not a “dead” (i.e., “non-driven”) section of rollers during normal conveying without diversion.

And, by virtue of the above-described structural and functional features of the repositionable bidirectional roller assembly, still another aspect of the present invention is that it provides a method of easily and quickly reconfiguring a prior art unidirectional roller conveyor to include one or a plurality of sections of bidirectional roller assemblies that facilitate the diversion of conveyed items therefrom. Thus, the present invention provides flexibility in the positioning and repositioning of the bidirectional roller assemblies, which thereby provides a desirable degree of flexibility in operation of the conveyor system.

Accordingly, in summary, the advantages provided by the repositionable bidirectional roller assembly of the present invention are numerous. The bidirectional roller assembly includes bidirectional wheels that enable the diversion of conveyed items from the conveyor in a diversion direction that is different from that of the transport direction of the conveyor. The bidirectional roller assembly includes a plurality of driven bidirectional wheels that rotate both in the conveyor transport direction and in the diversion direction, and a hub assembly having a reversibly compressible shaft. The compressibility of the hub assembly shaft enables the bidirectional roller assembly to easily be inserted into, and removed from, an existing conveyor. By virtue of the reversibly compressible hub assembly shaft, the invention provides operational flexibility, since any bidirectional roller assembly can easily be removed from a given position and reinserted in the conveyor at a desired different position, thus enabling the diversion of conveyed items to be attained at any point along the length of the conveyor.

The foregoing objects and advantages together with other objects and advantages which will become subsequently apparent reside in the details of construction and operation as more fully hereinafter described, reference being had to the accompanying drawings forming a part hereof, wherein like reference numbers refer to like parts throughout. The accompanying drawings are intended to illustrate the invention, but are not necessarily to scale.

DETAILED DESCRIPTION OF THE PREFERRED EMBODIMENTS

Figure 1:
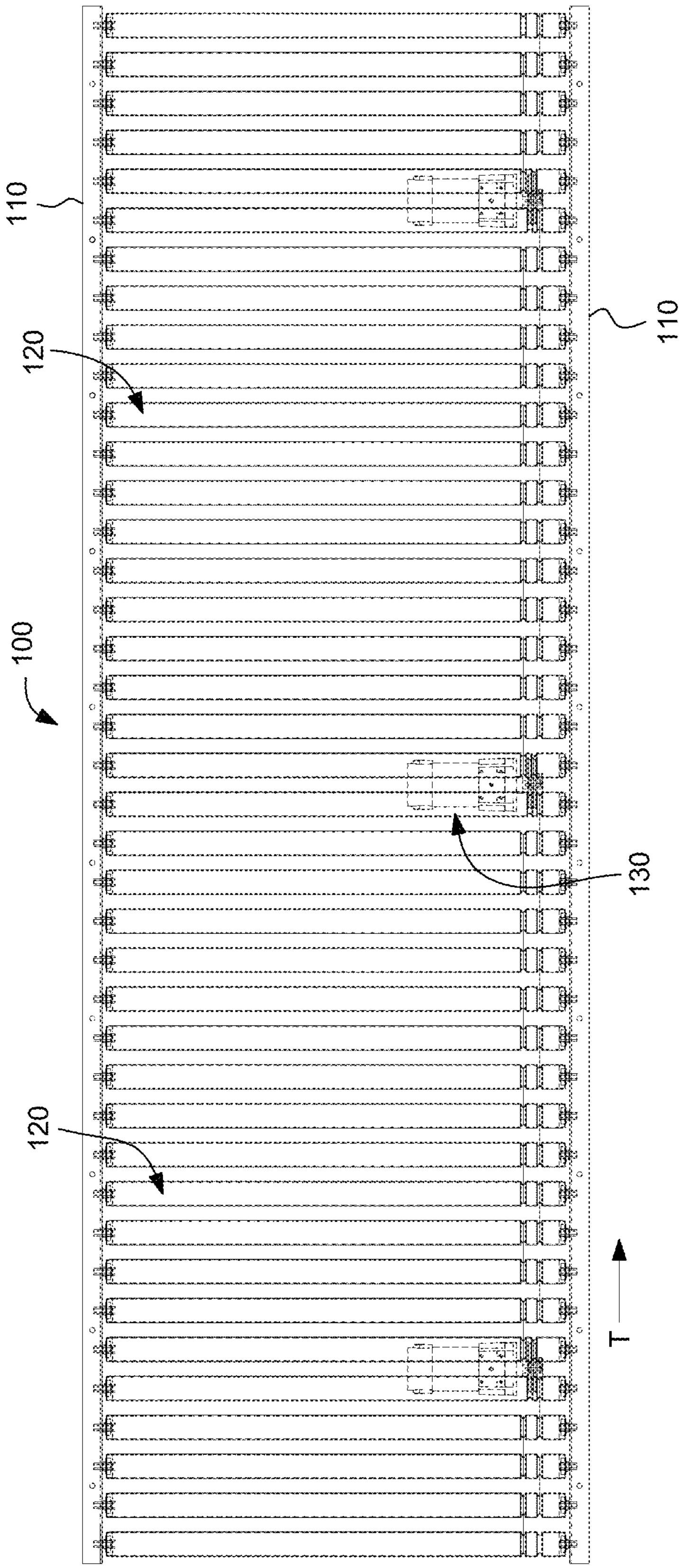
FIG. 1 is a top view of a prior art band driven conveyor having unidirectional rollers.

Although only preferred embodiments of the present invention are explained in detail, it is to be understood that the invention is not limited in its scope to the details of construction and arrangement of components set forth in the following description or illustrated in the drawings. As described hereinafter, the present invention is capable of other embodiments and of being practiced or carried out in various ways.

Also, in describing the preferred embodiments, terminology will be resorted to for the sake of clarity. It is intended that each term contemplates its broadest meaning as understood by those skilled in the art, and includes all technical equivalents which operate in a similar manner to accomplish a similar purpose.

As used herein, for the purposes of this specification, including the appended claims, the terms "about" and "approximately" when modifying numbers expressing a number of sizes, dimensions, portions, shapes, formulations, parameters, percentages, quantities, characteristics, and other numerical values used in the specification and claims, the term is meant to encompass the stated value plus or minus 10%.

Before turning to a description of the various features of the present invention, it is helpful to understand the drawbacks of both prior art unidirectional roller conveyors, and prior art bidirectional roller conveyors.

Figure 2:
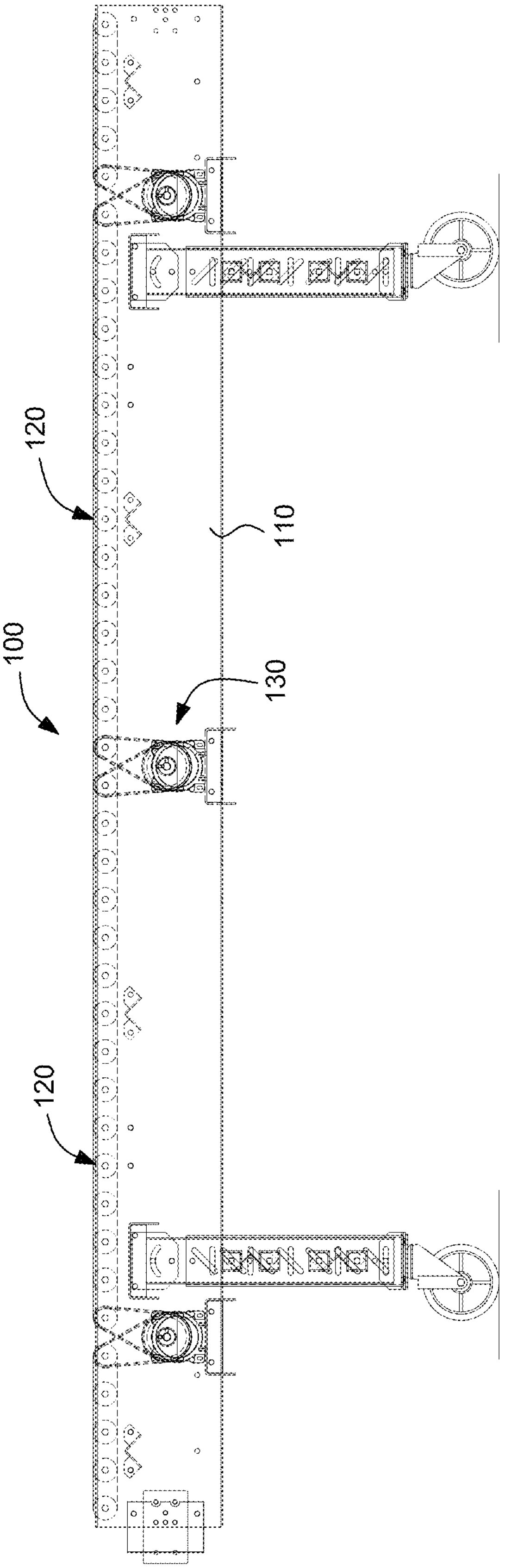
FIG. 2 is a side elevational view of the prior art band driven conveyor shown in FIG. 1.
Figure 3:
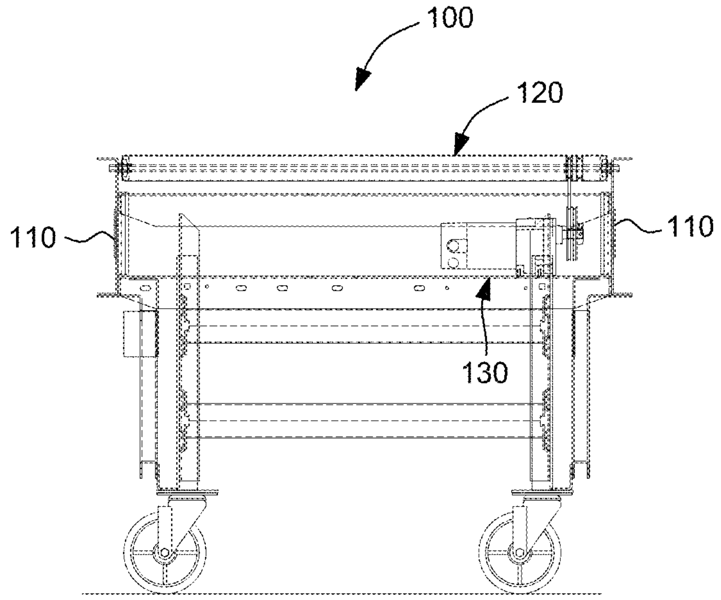
FIG. 3 is an end elevational view of the prior art band driven conveyor shown in FIG. 1.
Figure 4:
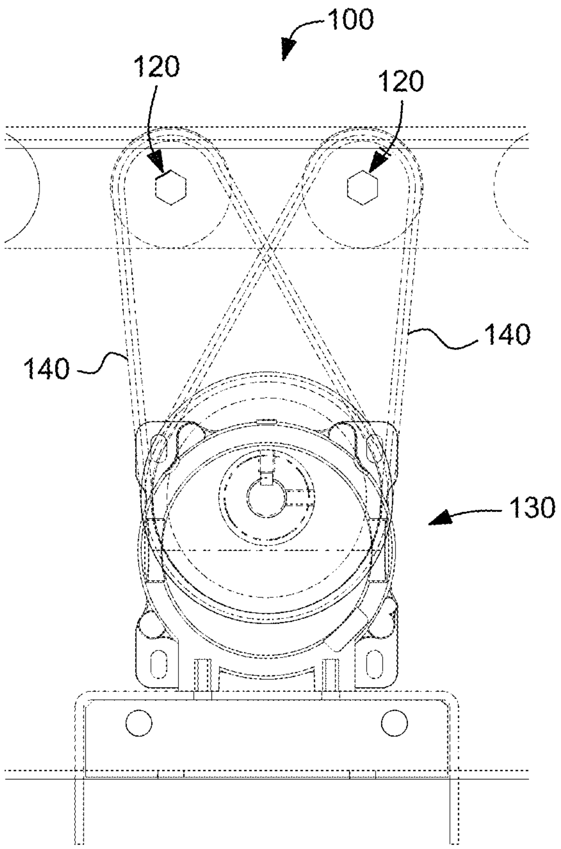
FIG. 4 is an enlarged partial side elevational view of the prior art band driven conveyor shown in FIG. 1, illustrating a drive motor and associated drive bands.

FIGS. 1, 2, and 3 show a prior art band driven conveyor 100 having a plurality of unidirectional roller assemblies 120. The conveyor 100 includes a frame 110 and drive motor assemblies 130. FIG. 4 shows an enlarged view of the drive motor assembly 130 and the associated drive bands 140 that drive the unidirectional roller assemblies 120 in transport direction T.

Figure 5:
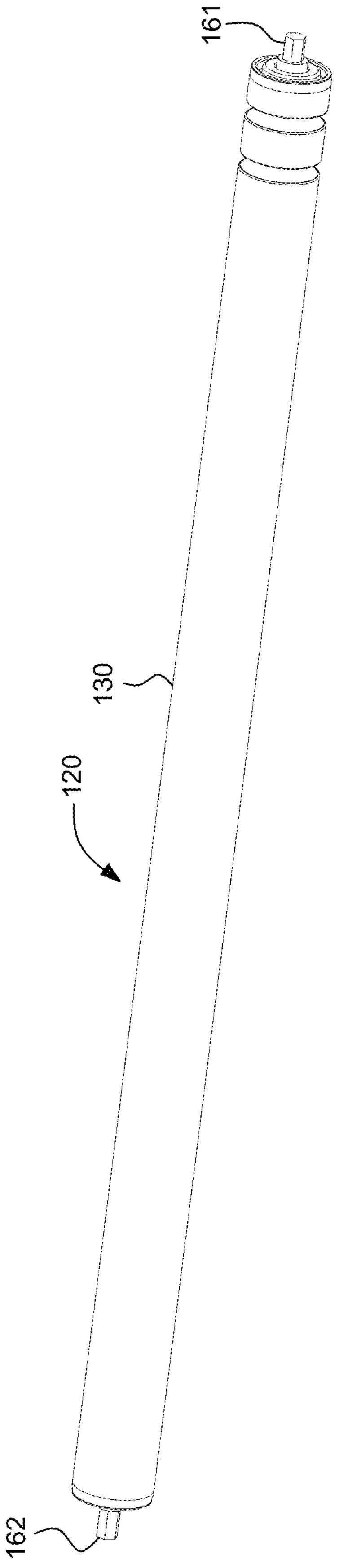
FIG. 5 is a perspective view of a unidirectional roller assembly of the prior art band driven conveyor shown in FIG. 1.
Figure 6:
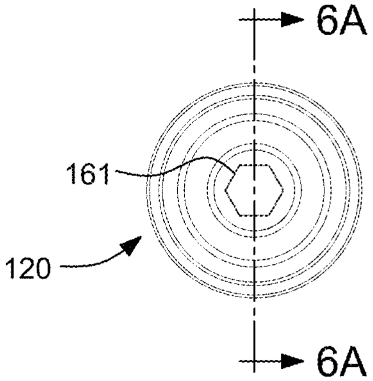
FIG. 6 is an enlarged right-side end elevational view of the unidirectional roller assembly shown in FIG. 5.
Figure 6A:
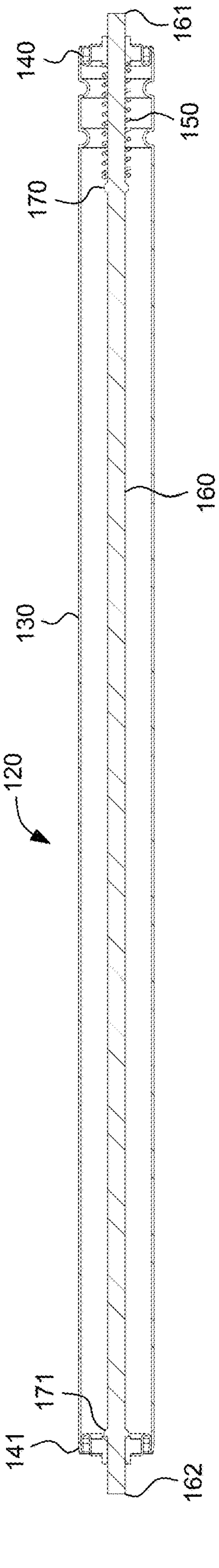
FIG. 6A is a side cross-sectional view of the unidirectional roller assembly shown in FIG. 6.

FIGS. 5, 6, and 6A illustrate various structural elements of the unidirectional roller assembly 120. FIG. 5 shows a unidirectional roller 130, and a first end 161 and a second end 162 of a roller shaft. FIG. 6 is an enlarged right-side end elevational view of the unidirectional roller assembly 120 shown in FIG. 5. As is seen in FIG. 6A, unidirectional roller assembly 120 includes the roller shaft 160, which is rotationally supported on the first end 161 of the roller shaft 160 by bearing 140 and rotationally supported on the second end 162 of the roller shaft 160 by bearing 141. The bearings 140, 141 enable the unidirectional roller 130 to rotate, while the roller shaft 160 remains stationary. The unidirectional roller assembly 120 includes a spring 150, which enables the roller shaft 160 to be reversibly compressed, so as to facilitate insertion and removal of the unidirectional roller assembly 120 from the conveyor frame 110. The roller shaft 160 includes stakes (i.e., protrusions) 170, 171 which function to position the roller shaft in the roller 130.

Figure 7:
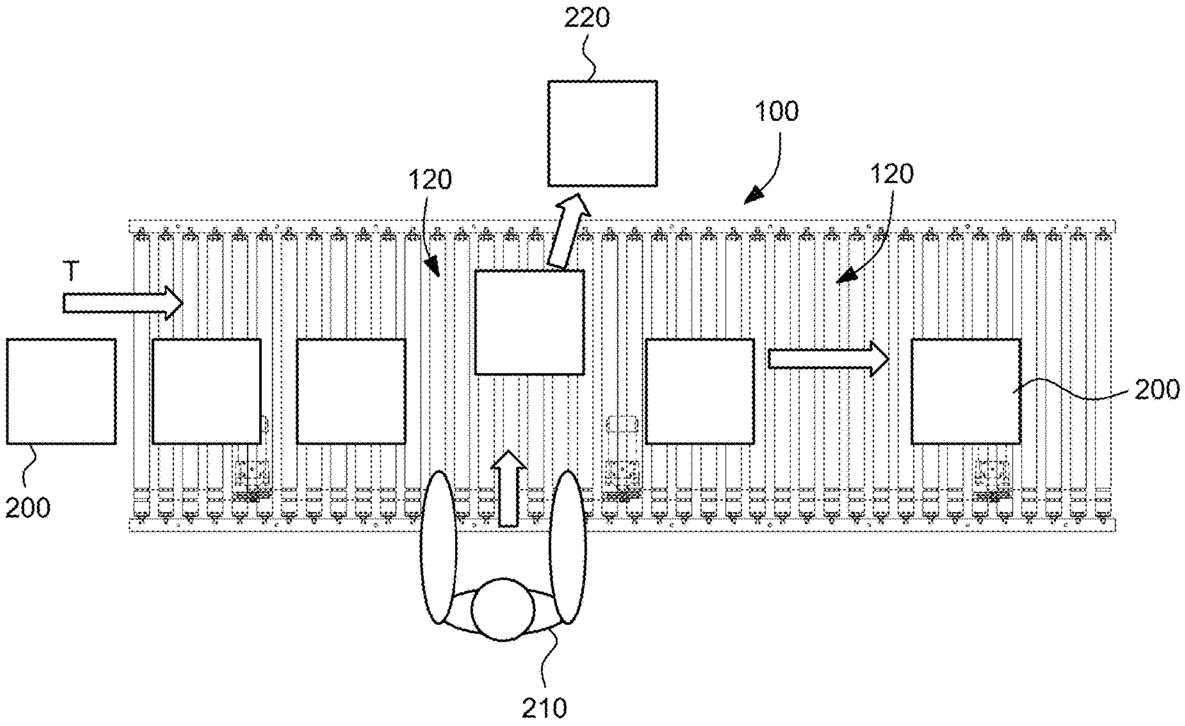
FIG. 7 is an overhead view of an operator diverting a conveyed item from the prior art band driven conveyor shown in FIG. 1.

FIG. 7 is a schematic depiction that illustrates a drawback associated with using a prior art unidirectional roller conveyor 100 in a mode of operation that requires a conveyed item 200 to be diverted from the normal transport direction T of the conveyor. As shown, to divert a conveyed item 200, an operator 210 must manually push the conveyed item 220 across the axial length of the rotating unidirectional roller assemblies 120 and over the frame 110 of the conveyor, oftentimes into a chute, into a hopper, onto a table, or onto another conveyor, etc. However, the effort it takes to push the packages across the conveyor rollers can be difficult for an operator to do for extended periods of time.

Figure 8:
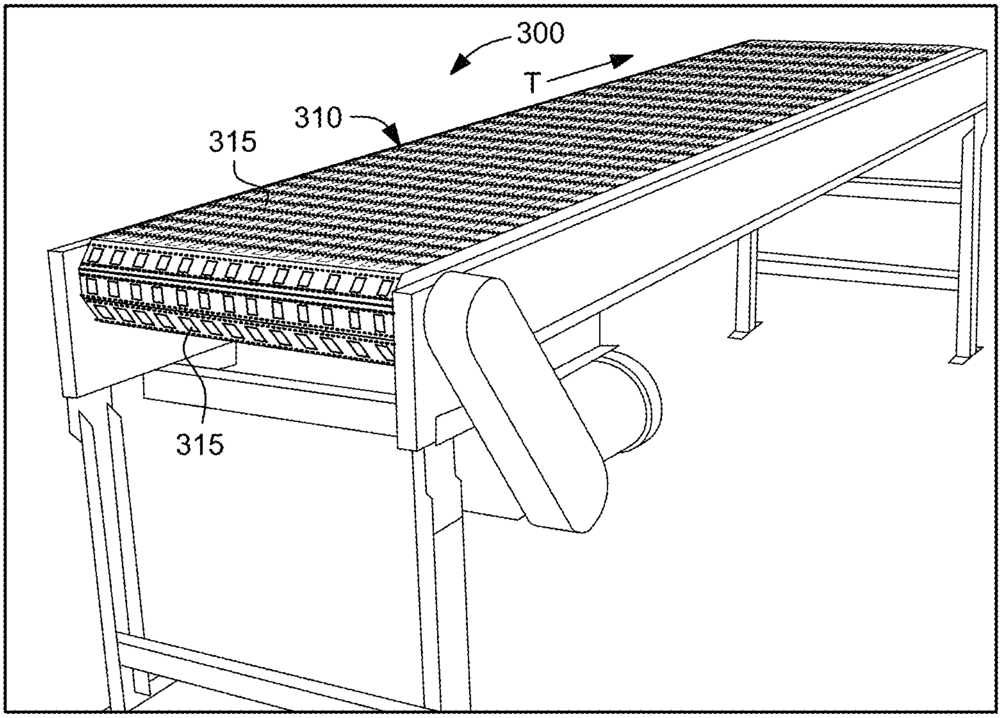
FIG. 8 is a perspective view of a prior art transverse roller top belt conveyor.

Accordingly, one prior art solution is to replace the unidirectional roller conveyor 100 with a transverse roller top belt conveyor 300, such as that shown in FIG. 8. The transverse roller top belt conveyor 300 is, as its name implies, a continuous belt conveyor that has within a belt 310 a plurality of rows, each row containing a plurality of small transverse rollers, i.e., small unidirectional wheels 315. That is, wheels 315 that rotate only in a direction transverse to the transport direction T of the belt 310. However, the use of a transverse roller top belt conveyor 300 is not a desirable option for at least several reasons. First, transverse roller top conveyors are expensive. Second, one must remove an existing conveyor and install the transverse roller top conveyor, which necessitates incurring a high installation cost. And third, the diversion station is limited to the installed location because once installed, it is expensive to remove the transverse roller top conveyor, move it to a new location, and reinstall it in the system.

Figure 9A:
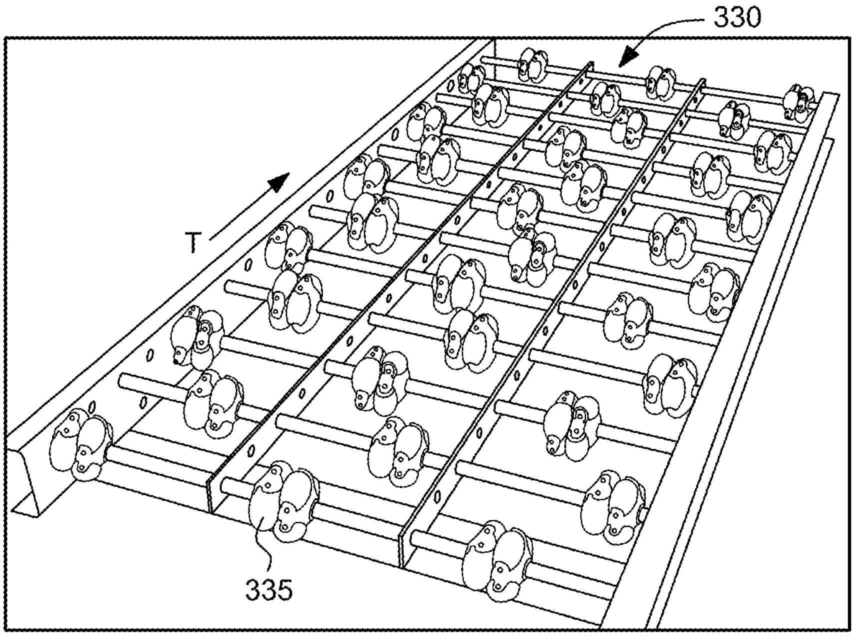
FIG. 9A is a partial perspective view of a prior art conveyor section having a plurality of undriven bidirectional wheels.
Figure 9B:
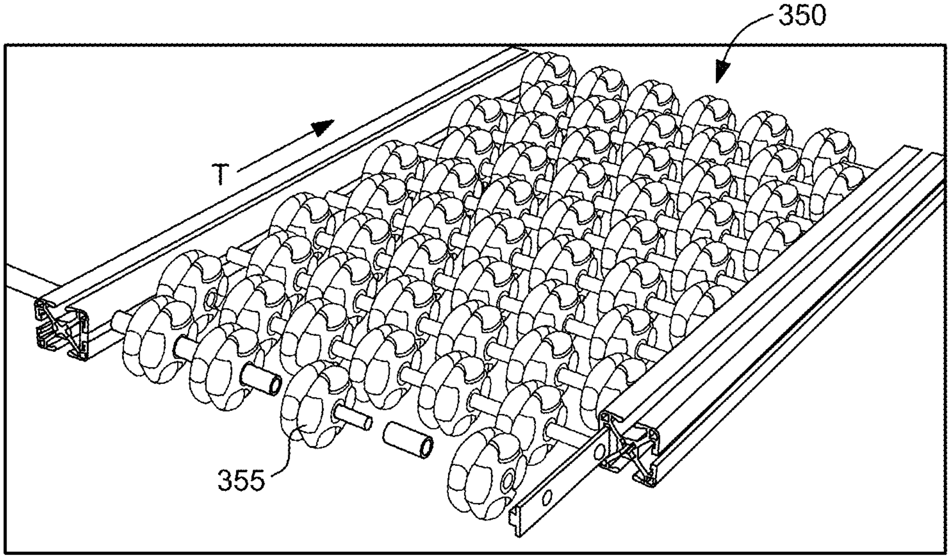
FIG. 9B is a partial perspective view of another prior art conveyor section having a plurality of undriven bidirectional wheels.

Another prior art approach is to modify a unidirectional roller conveyor by separating that conveyor so as to position therewithin a conveyor section having a plurality of undriven bidirectional wheels. That is, although the conveyor section 330 shown in FIG. 9A and the conveyor section 350 shown in 9B each have, respectively, a plurality of bidirectional wheels 335 and 355, the wheels are free wheeling, i.e., undriven in the transport direction T of the conveyor. However, drawbacks of this approach include those associated with the above-described transverse roller top conveyor, i.e., incurring the expense associated with removal of the unidirectional roller conveyor section and the subsequent installation of the section 330, 350 having the undriven bidirectional wheels 335, 355. And, the diversion station is limited to the installed location because once installed, it is expensive to remove the undriven bidirectional wheels section 330, 350, move it to a new location, and reinstall it in the system. Furthermore, because the bidirectional wheels 335, 355 are undriven, there is some loss of conveying efficiency in the transport direction T. In short, there are deficiencies associated with the use of an undriven bidirectional wheels section 330, 350.

Figure 9C:
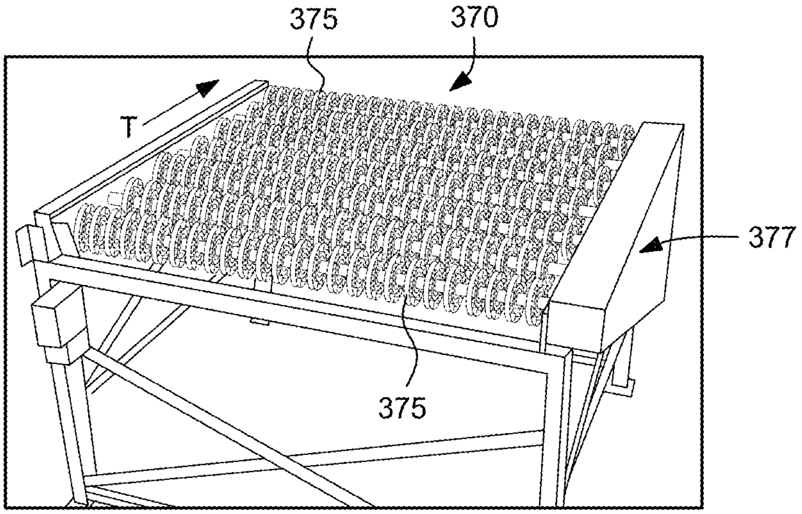
FIG. 9C is a perspective view of a prior art chain-driven bidirectional roller conveyor.

And, as shown in FIG. 9C, still another prior art approach is to modify a unidirectional roller conveyor by separating that conveyor so as to position therewithin a conveyor section 370 having driven bidirectional wheels 375. However, drawbacks of this approach include many of those associated with the above-described transverse roller top conveyor and undriven bidirectional wheels section, i.e., incurring the expense associated with removal of the unidirectional roller conveyor section and the subsequent installation of the section 370 having the driven bidirectional wheels 375. And, the diversion station is limited to the installed location because once installed, it is expensive to remove the driven bidirectional wheels section 370, move it to a new location, and reinstall it in the system. In short, there are also deficiencies associated with the use of a driven bidirectional wheels section 370.

Accordingly, to overcome the above-described drawbacks associated with the prior art conveyors, the present invention provides a repositionable bidirectional roller assembly that includes bidirectional wheels which enable the diversion of conveyed items from the conveyor in a diversion direction that is different from that of the transport direction of the conveyor. The bidirectional roller assembly includes a plurality of bidirectional wheels that rotate both in the conveyor transport direction and in the diversion direction, and a hub assembly having a reversibly compressible shaft. Each of the plurality of rotatable bidirectional wheels is configured to provide rotation for transport of a conveyed item in the conveyor transport direction, and to provide rotation for transport of a conveyed item in the diversion direction. The compressibility of hub shaft enables the bidirectional roller assembly to be easily inserted into, and removed from, an existing conveyor. By virtue of the reversibly compressible hub shafts, the invention provides operational flexibility, since any bidirectional roller assembly of the present invention can easily be removed from a given position and reinserted in the conveyor at a desired different location, thus enabling the diversion of conveyed items to be attained at any point along the length of the conveyor.

Figure 10:
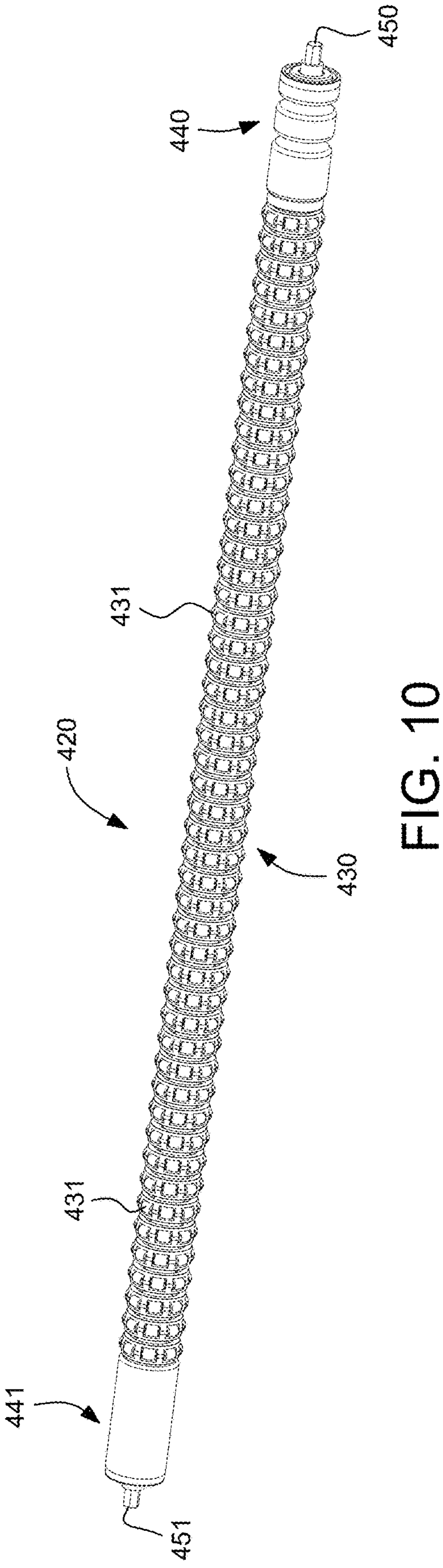
FIG. 10 is a perspective view of a first embodiment of a bidirectional roller assembly according to the present invention.

Thus, as shown in FIG. 10, according to a first embodiment of the present invention, a repositionable bidirectional roller assembly 420 includes a bidirectional wheel assembly 430 comprising a plurality of bidirectional wheels 431, a first drive hub assembly 440 and a hub assembly shaft 450 at one end, and a second non-drive hub assembly 441 and a hub assembly shaft 451 at the other end.

Figure 11:
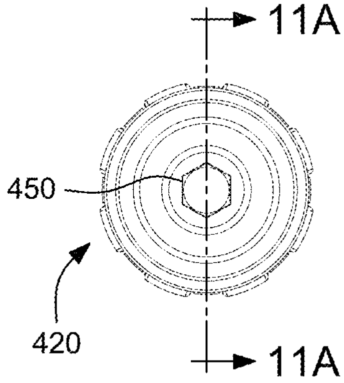
FIG. 11 is an enlarged right-side end elevational view of the bidirectional roller assembly shown in FIG. 10.
Figure 11A:
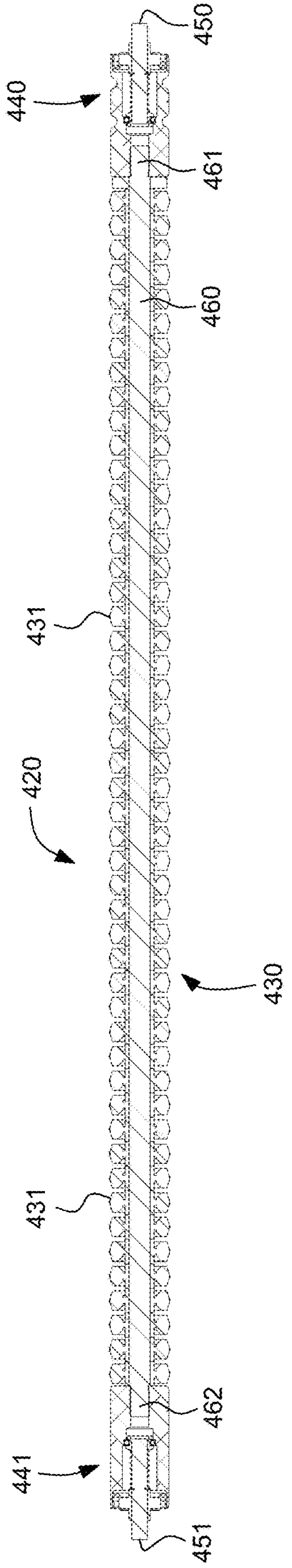
FIG. 11A is a side cross-sectional view of the bidirectional roller assembly shown in FIG. 11.

FIG. 11 is an enlarged right-side end elevational view of the bidirectional roller assembly 420 shown in FIG. 10. And, as is seen in FIG. 11A, bidirectional roller assembly 420 also includes a roller shaft 460 having a first roller shaft end 461 in connection with first hub assembly 440 and a second roller shaft end 462 in connection with second hub assembly 441. According to a preferred embodiment of the present invention, and as shown in, for example, FIG. 12, the roller shaft 460 has a hexagonal cross-sectional shape. The first roller shaft end 461 and the second roller shaft end 462 are each machined to have threads so as to threadably connect to a threaded section of, respectively, the first hub assembly 440 and the second hub assembly 441. By virtue of the threaded connections, the roller shaft 460 rotates as the first hub assembly 440 is rotatably driven. Details of the roller shaft-to-hub assemblies connection are provided below in connection with the description of FIGS. 14A and 15.

Figure 12:
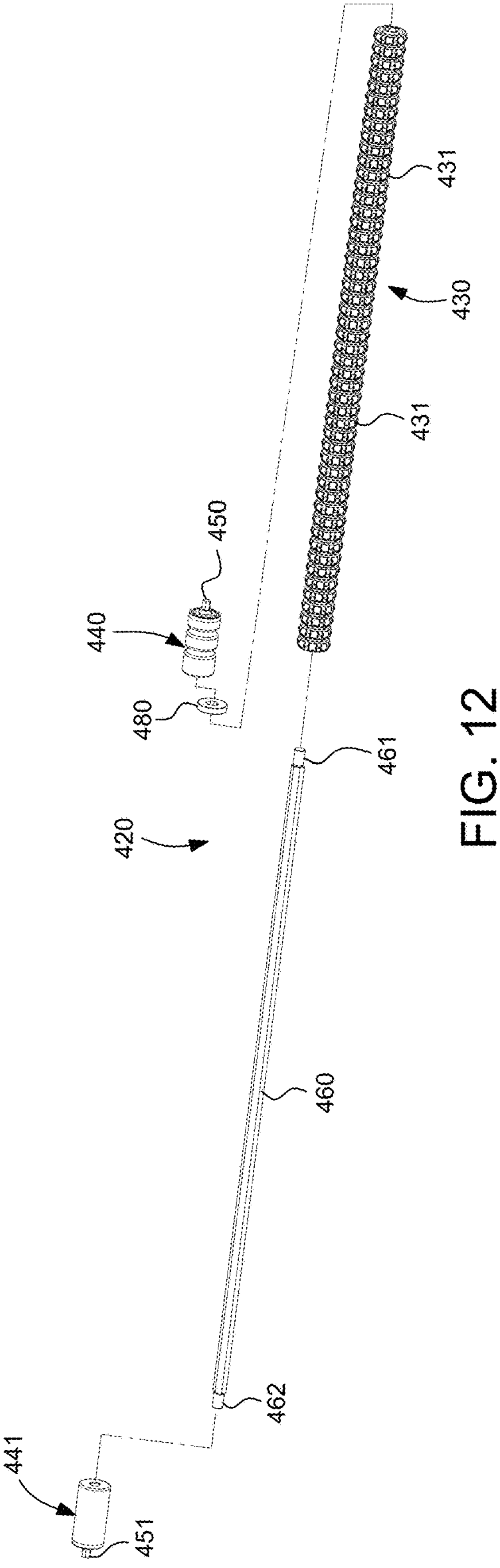
FIG. 12 is an exploded perspective view of the bidirectional roller assembly as shown in FIG. 10, illustrating various structural details thereof.

As shown in FIG. 12, which presents an exploded view for ease of understanding, each bidirectional roller assembly 420 includes in general: the roller shaft 460 having the first roller shaft end 461 and the second roller shaft end 462; the bidirectional wheel assembly 430 having the plurality of bidirectional wheels 431; and the first hub assembly 440 and the second hub assembly 441. By virtue of the features of the above-described structural elements of the bidirectional roller assembly 420, ease of assembly is ensured. For example, in a first step, to prevent loosening during use of the conveyor, a material such as Loctite® is applied to the threads at one end of the roller shaft 460, such as at first roller shaft end 461, and then the first hub assembly 440 is threaded onto the first roller shaft end 461. Next, a desired number and arrangement of bidirectional wheels 431 and spacers 480, such as, for example, those associated with bidirectional wheel assembly 430, are slid onto the roller shaft 460. And finally, to complete the assembly, the material such as Loctite® is applied to the threads at the other end of the roller shaft 460, i.e., at second roller shaft end 462, and then the second hub assembly 441 is threaded onto the second roller shaft end 462.

Aside from the above-described ease of initial assembly per se, another advantageous feature of the present invention is that the configuration of any one bidirectional roller assembly 420, or of an entire section of bidirectional roller assemblies, can easily and quickly be changed depending upon the particular operational needs of the conveyor system. See the further detailed description below associated with the various embodiments of the bidirectional roller assembly 420 illustrated in FIGS. 21-29.

Figure 13:
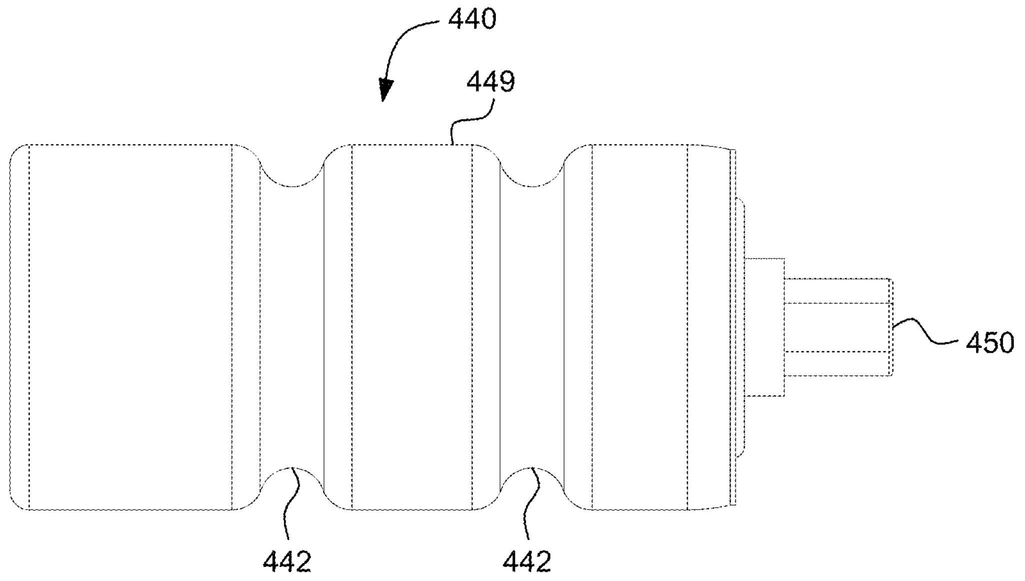
FIG. 13 is an enlarged side elevational view of a first hub assembly of the bidirectional roller assembly shown in FIG. 10.

FIG. 13 is an enlarged side elevational view of the first drive hub assembly 440 of the bidirectional roller assembly 420 shown in FIG. 10. FIG. 13 illustrates hub 449, and grooves 442 within which the drive bands 140 (see FIG. 4) travel to rotatably drive the bidirectional roller assemblies 420.

Figure 14:
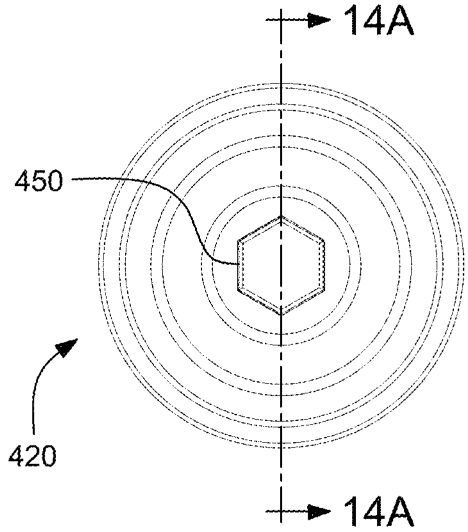
FIG. 14 is an enlarged right-side end elevational view of the first hub assembly shown in FIG. 13.
Figure 14A:
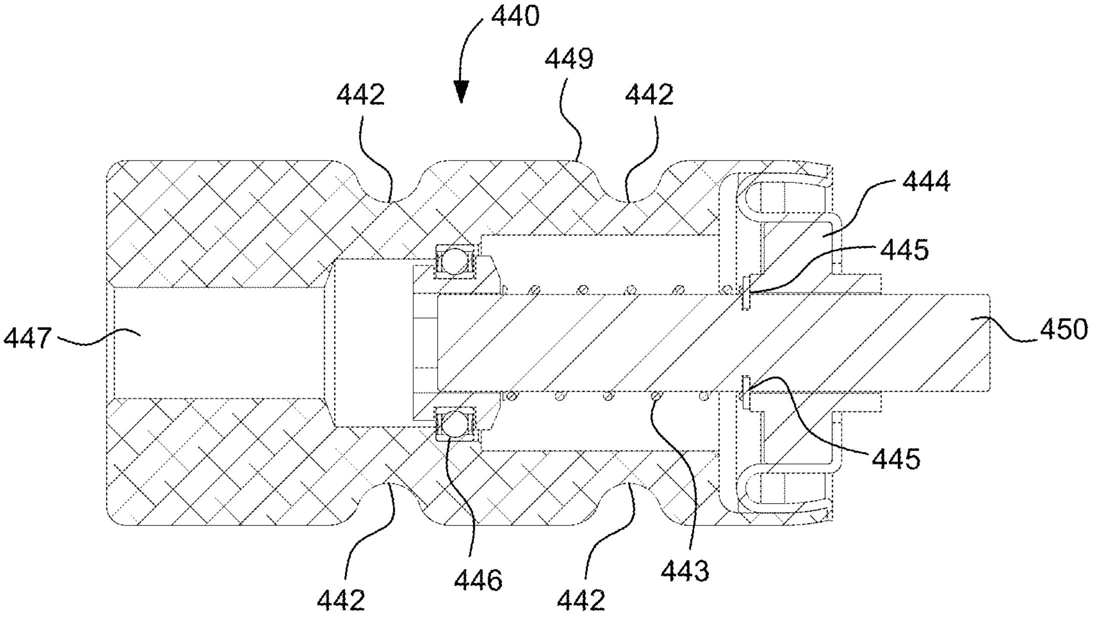
FIG. 14A is an enlarged cross-sectional view of the first hub assembly shown in FIG. 13.
Figure 15:
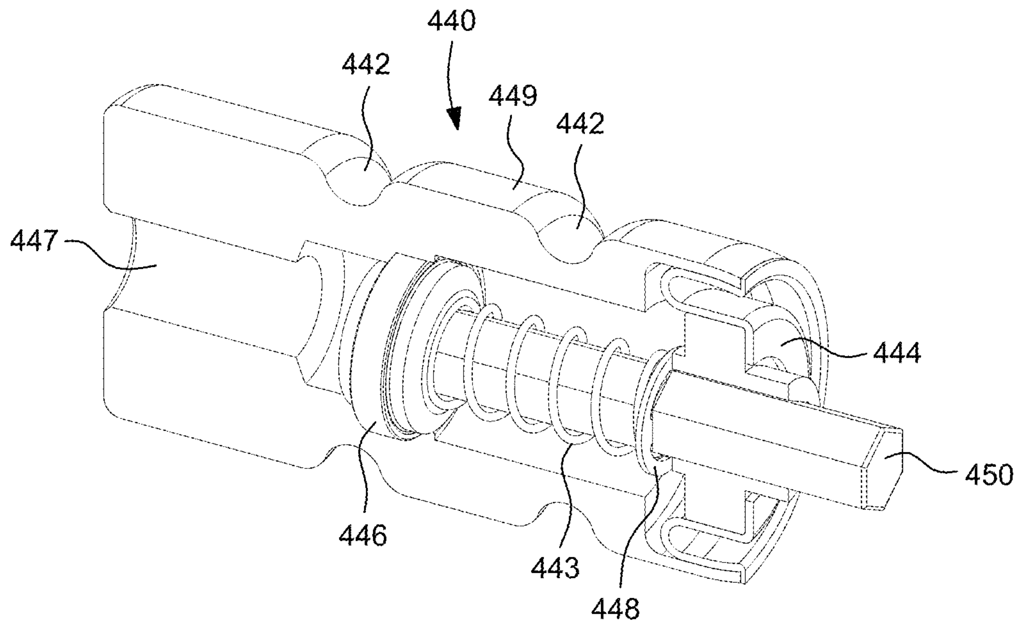
FIG. 15 is an enlarged perspective cutaway view of the first hub assembly shown in FIG. 13.

FIG. 14 is an enlarged right-side end elevational view of the first hub assembly 440 shown in FIG. 13, FIG. 14A is an enlarged cross-sectional view of the first hub assembly 440 shown in FIG. 13, and FIG. 15 is an enlarged perspective cutaway view of the first hub assembly shown in FIG. 13.

As shown in FIG. 14A, the first hub assembly 440 includes the aforementioned hub 449, preferably made of aluminum or other suitable metal or material, and the grooves 442. As described above, the first roller shaft end 461 is machined to have threads so as to threadably connect to a correspondingly threaded section 447 of the first hub assembly 440. The first hub assembly 440 includes a reversibly compressible first hub shaft 450, a spring 443 which functions to return the first hub shaft 450 to an extended, i.e., non-compressed, position, a bearing 444 which supports a first end of first hub shaft 450 and a bearing 446 to support a second end of first hub shaft 450. Per FIG. 14A, the first hub shaft 450 includes a groove 445, which houses, as shown in FIG. 15, a retainer ring 448, which serves to prevent, upon decompression of the spring, the first hub shaft 450 from extending outwardly beyond its uncompressed position.

Figure 16:
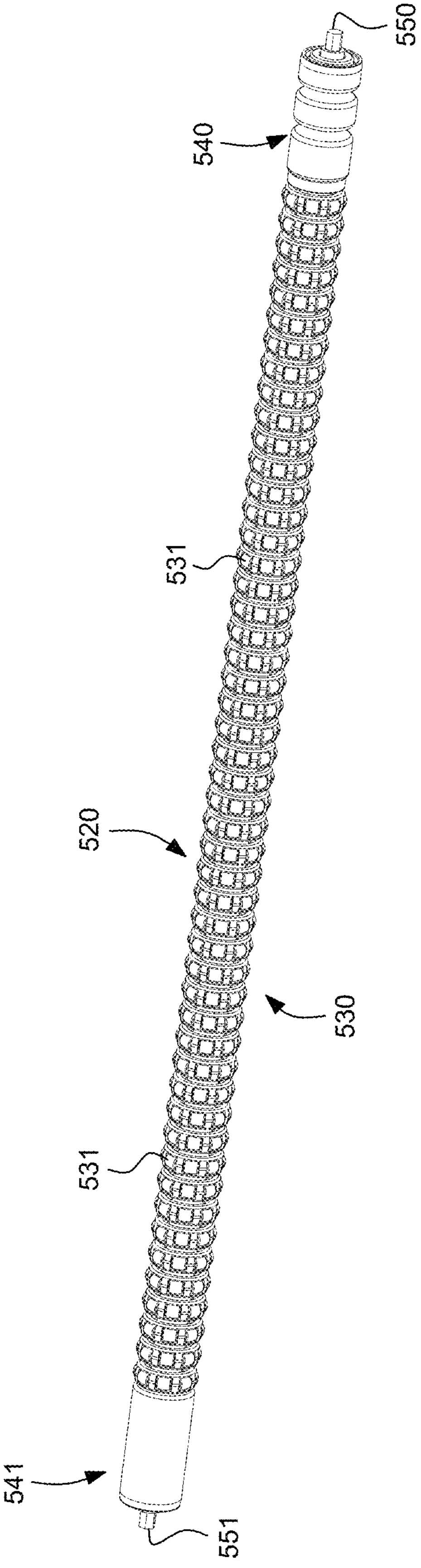
FIG. 16 is a perspective view of a second embodiment of a bidirectional roller assembly according to the present invention.

FIG. 16 is a perspective view of a second embodiment of a bidirectional roller assembly 520 according to the present invention. A primary difference between the first embodiment of the bidirectional roller assembly 420 and the second embodiment of the bidirectional roller assembly 520 is that the second embodiment employs a self-contained spring loaded bearing shaft assembly 543 (see FIG. 18).

Figure 17:
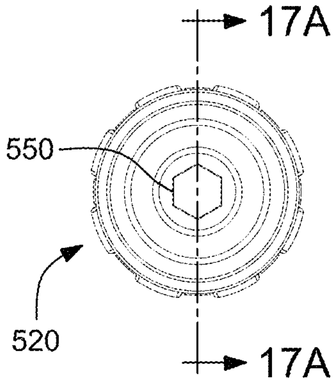
FIG. 17 is an enlarged right-side end elevational view of the bidirectional roller assembly shown in FIG. 16.
Figure 17A:
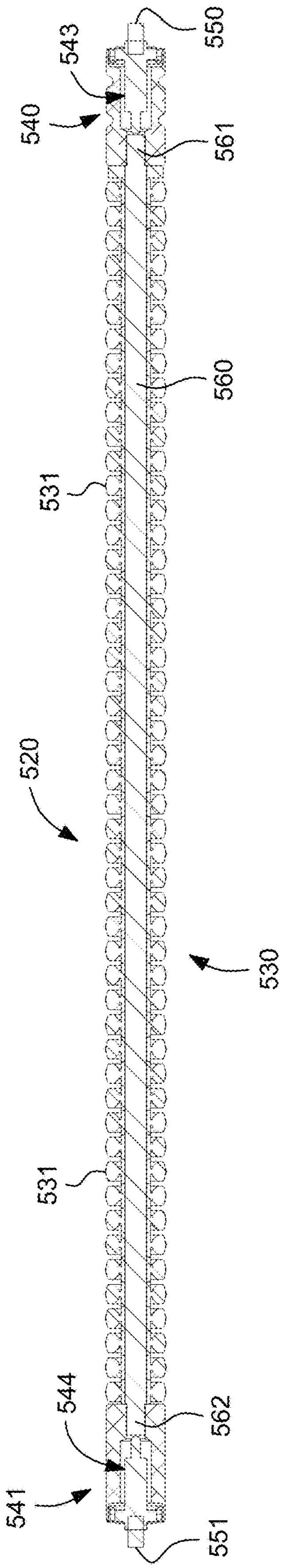
FIG. 17A is a side cross-sectional view of the bidirectional roller assembly shown in FIG. 16.

Thus, as shown in FIGS. 16 and 17A, according to the second embodiment of the present invention, a bidirectional roller assembly 520 includes a bidirectional wheel assembly 530 having a plurality of bidirectional wheels 531, a first drive hub assembly 540, the self-contained spring loaded bearing shaft assembly 543 having a reversibly compressible first hub shaft 550, a second non-drive hub assembly 541, and a second self-contained spring loaded bearing shaft assembly 544 having a reversibly compressible second hub shaft 551.

FIG. 17 is an enlarged right-side end elevational view of the bidirectional roller assembly 520 shown in FIG. 16. And, as is seen in FIG. 17A, bidirectional roller assembly 520 also includes a roller shaft 560 having a first roller shaft end 561 in connection with first hub assembly 540 and a second roller shaft end 562 in connection with second hub assembly 541. The first roller shaft end 561 and the second roller shaft end 562 are each machined to have threads so as to threadably connect to a threaded section of, respectively, the first hub assembly 540 and the second hub assembly 541. By virtue of the threaded connections, the roller shaft 560 rotates as the first hub assembly 540 is rotatably driven. Details of the roller shaft-to-hub assemblies connection are provided below in connection with the description of FIGS. 18 and 19.

Figure 18:
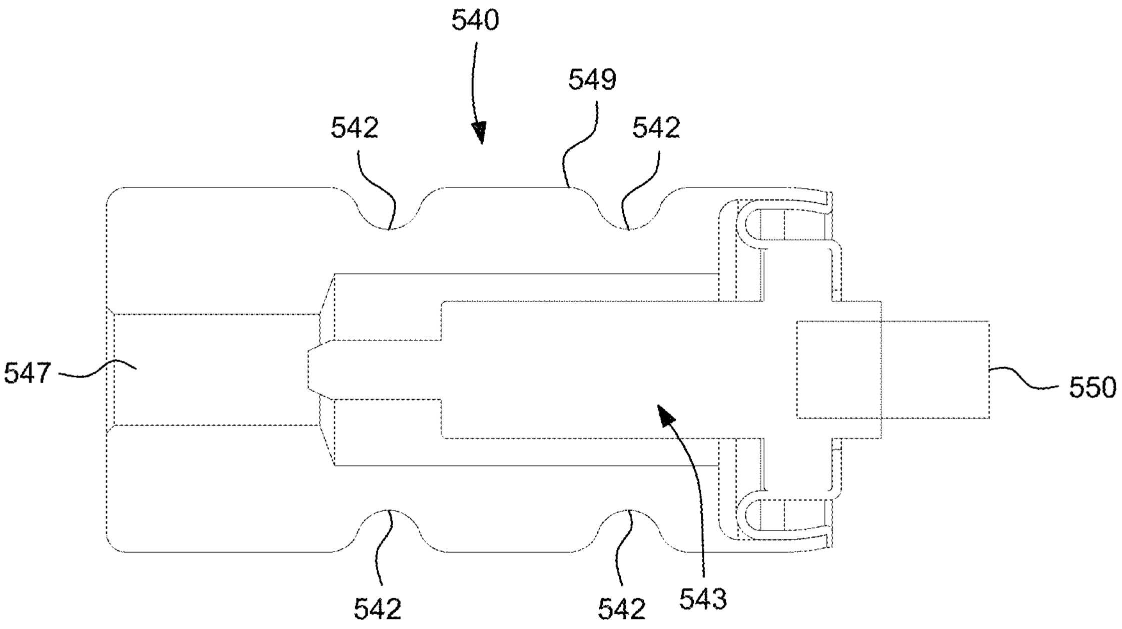
FIG. 18 is an enlarged cross-sectional view of a first hub assembly of the bidirectional roller assembly shown in FIG. 17A.
Figure 19:
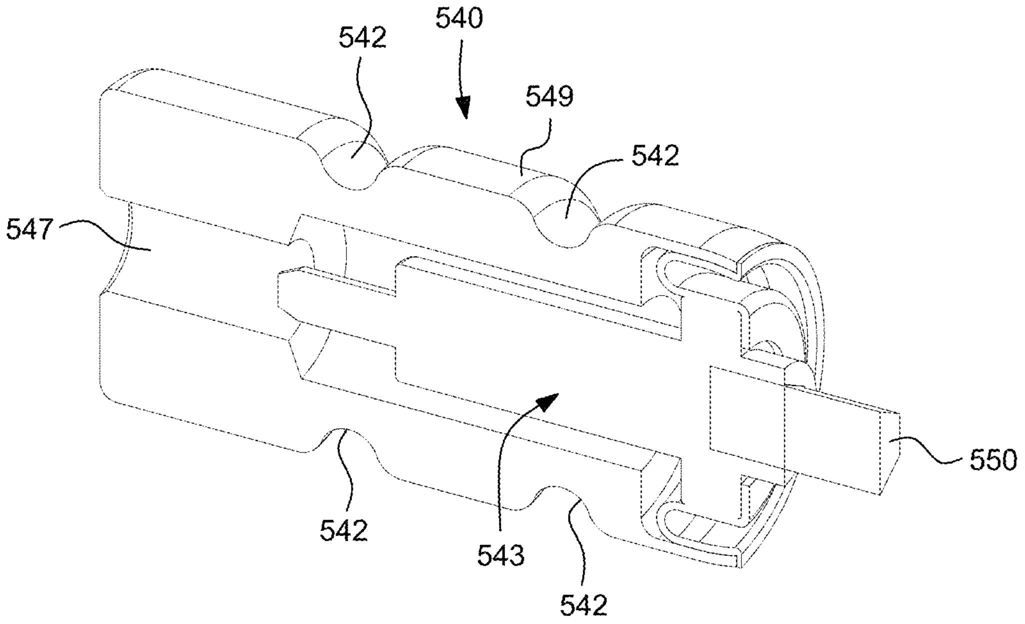
FIG. 19 is an enlarged perspective cutaway view of the first hub assembly shown in FIG. 18.

FIG. 18 is an enlarged cross-sectional view of the first hub assembly 540 shown in FIG. 16, and FIG. 19 is an enlarged perspective cutaway view of the first hub assembly shown in FIG. 16. Per FIGS. 18 and 19, the first hub assembly 540 includes the aforementioned hub 549, including grooves 542. As described above, the first roller shaft end 561 is machined to have threads so as to threadably connect to a correspondingly threaded section 547 of the first hub assembly 540. The first hub assembly 540 includes a reversibly compressible first hub shaft 550, which functions in conjunction with the self-contained spring loaded bearing shaft assembly 543. The self-contained spring loaded bearing shaft assembly 543 functions to both support the first hub shaft 550, and to return the first hub shaft 550 to an extended, i.e., non-compressed, position.

Figure 20:
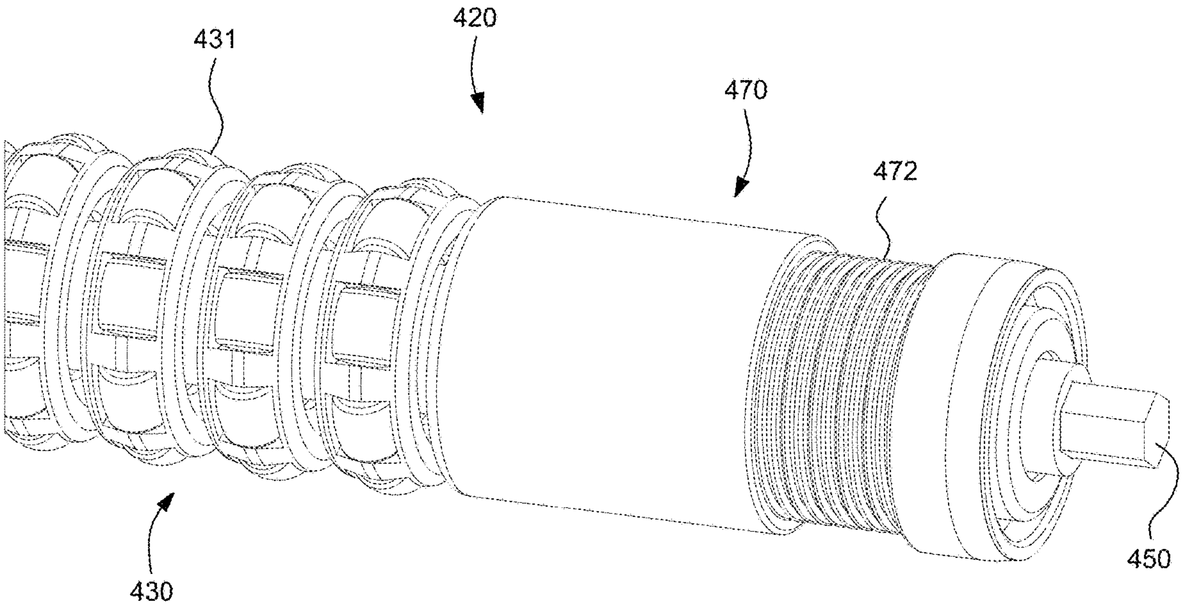
FIG. 20 is an enlarged perspective view of the first hub assembly and the bidirectional wheels of the bidirectional roller assembly shown in FIG. 10, illustrating a hub assembly groove associated with a Poly-V type drive belt.

FIG. 20 is an enlarged perspective view of another embodiment of the first hub assembly, here first hub assembly 470, and the bidirectional wheels of the bidirectional roller assembly 420 shown in FIG. 10. Per FIG. 20, instead of the above-described hub assembly grooves 442 or 542 that accommodate a band 140, hub assembly groove 472 is configured to accommodate a Poly-V type drive belt (not shown). And, as would be understood by one skilled in the art of roller conveyors, the bidirectional roller assembly 420 should correspond in length and diameter to that of the unidirectional roller assembly 120 that it replaces.

In the following description of various configurations of the inventive bidirectional roller assemblies, in the interest of brevity, the description is made with reference to bidirectional roller assembly 420 and its associated 400-series structural elements as described herein. However, it is to be understood that the same descriptions are applicable to bidirectional roller assembly 520 and its associated 500-series structural elements.

Figure 21:
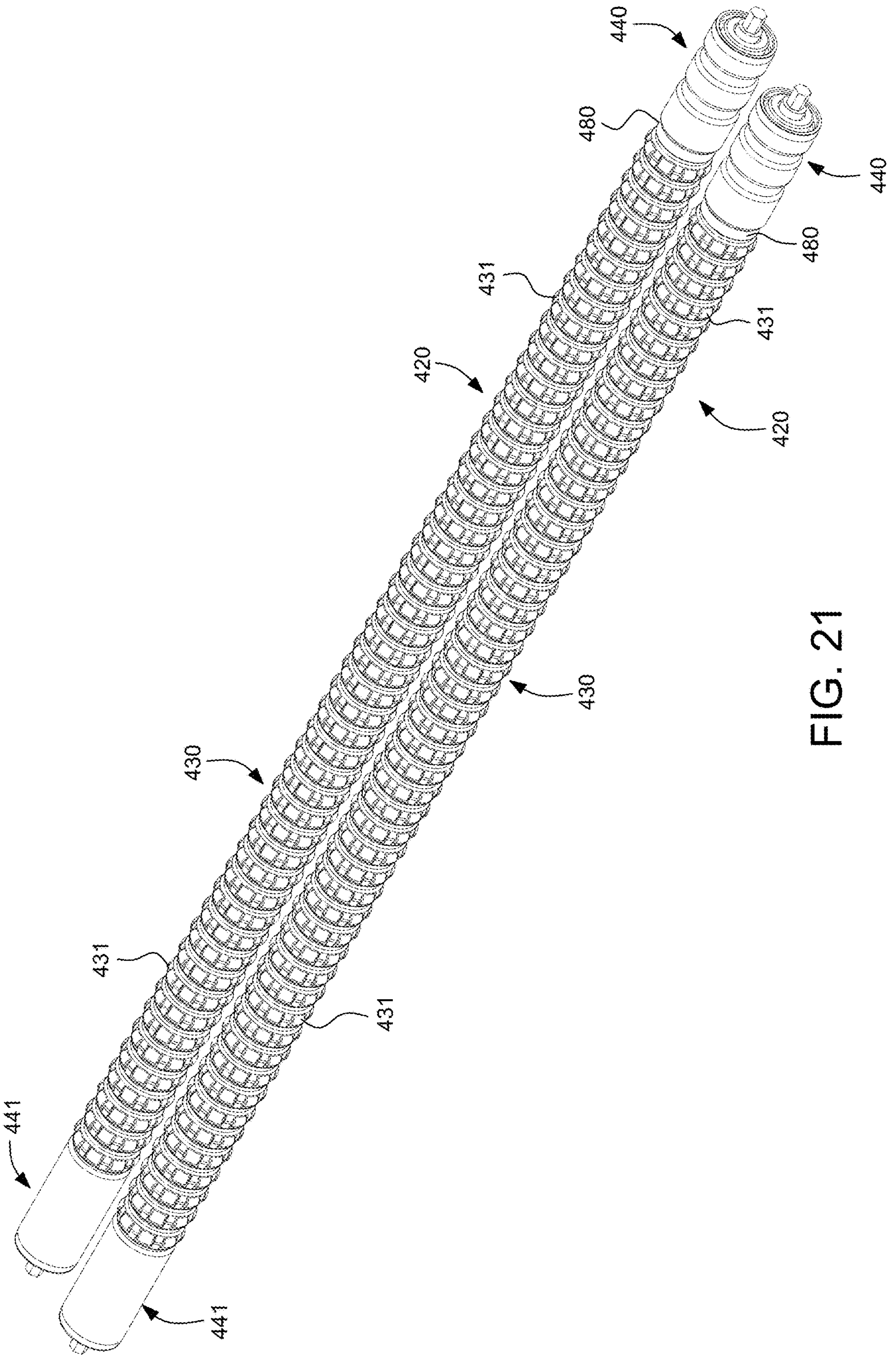
FIG. 21 is a perspective view of a pair of the bidirectional roller assemblies shown in FIG. 10, illustrating roller centers on a first spacing according to a first configuration of the invention.
Figure 25:
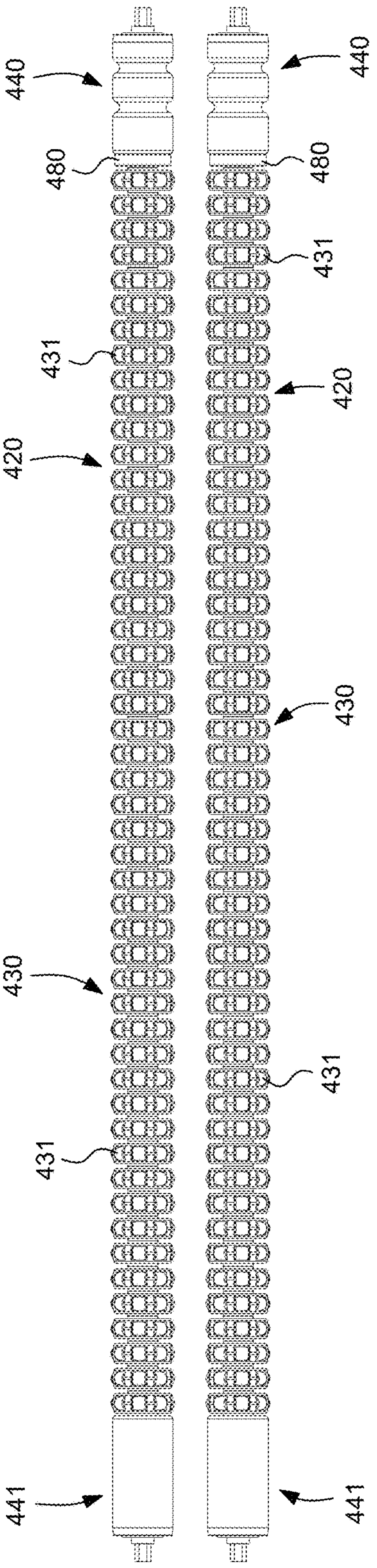
FIG. 25 is a top view of the pair of the bidirectional roller assemblies shown in FIG. 21, illustrating the parallel alignment of the wheels associated with the roller centers being on the wider spacing.

Now, turning to the aforementioned various configurations, depending upon the particular service in which the inventive bidirectional roller assembly 420 is to be used, adjacent roller assemblies can be arranged in various ways. For example, according to a first configuration of the invention, FIGS. 21 and 25 show a pair of the bidirectional roller assemblies 420 shown in FIG. 10, and illustrate the roller centers on a first spacing. As is evident from FIG. 25, the bidirectional wheels 431 of the adjacent bidirectional roller assemblies 420 are aligned with one another in the transport direction of the conveyor. And, for each of the adjacent bidirectional roller assemblies 420, a spacer 480 is positioned between the bidirectional wheel assembly 430 and the first hub assembly 440.

Figure 22:
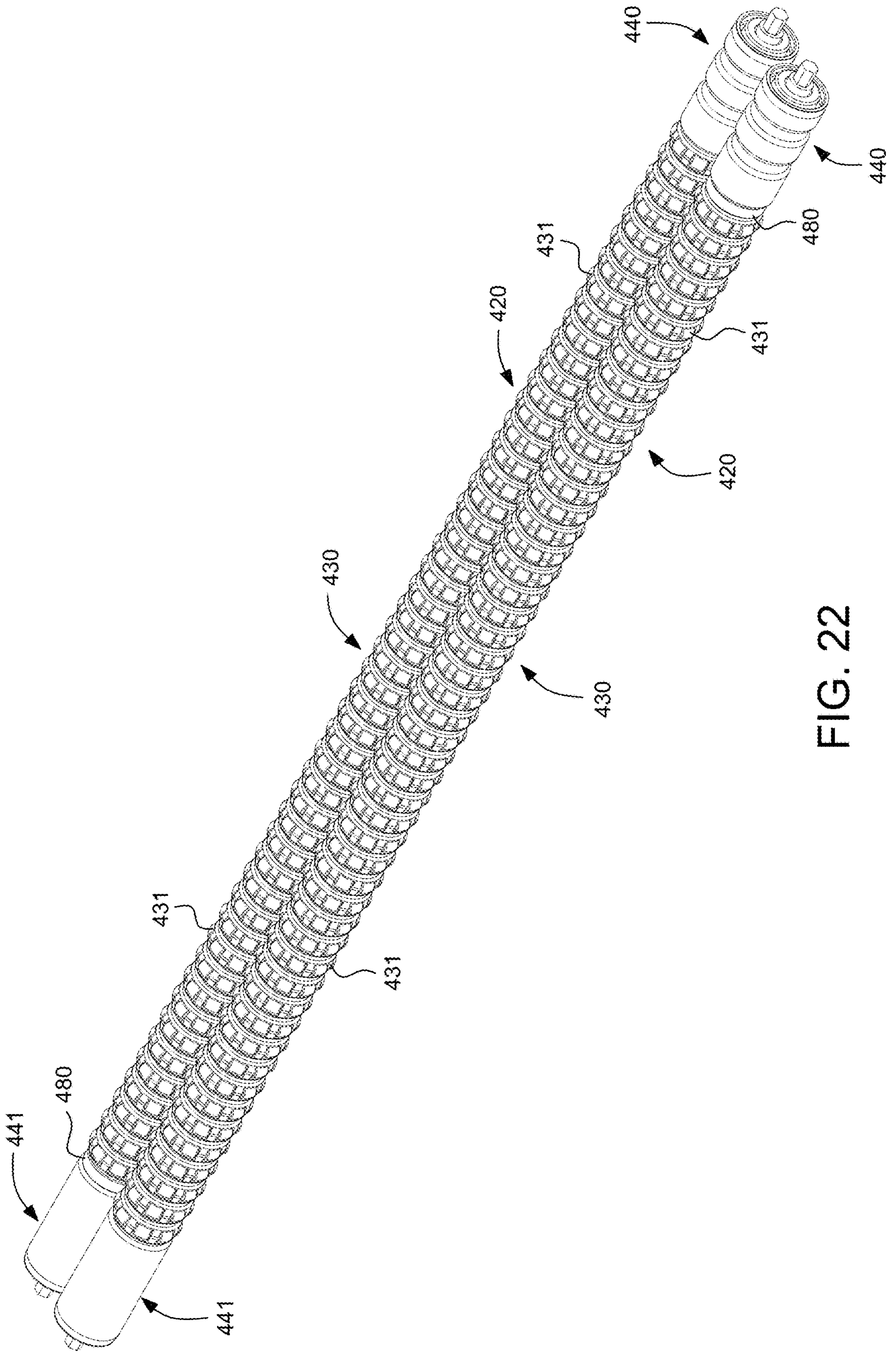
FIG. 22 is a perspective view of a pair of the bidirectional roller assemblies shown in FIG. 10, illustrating roller centers on a second, somewhat narrower spacing, according to a second configuration of the invention.
Figure 26:
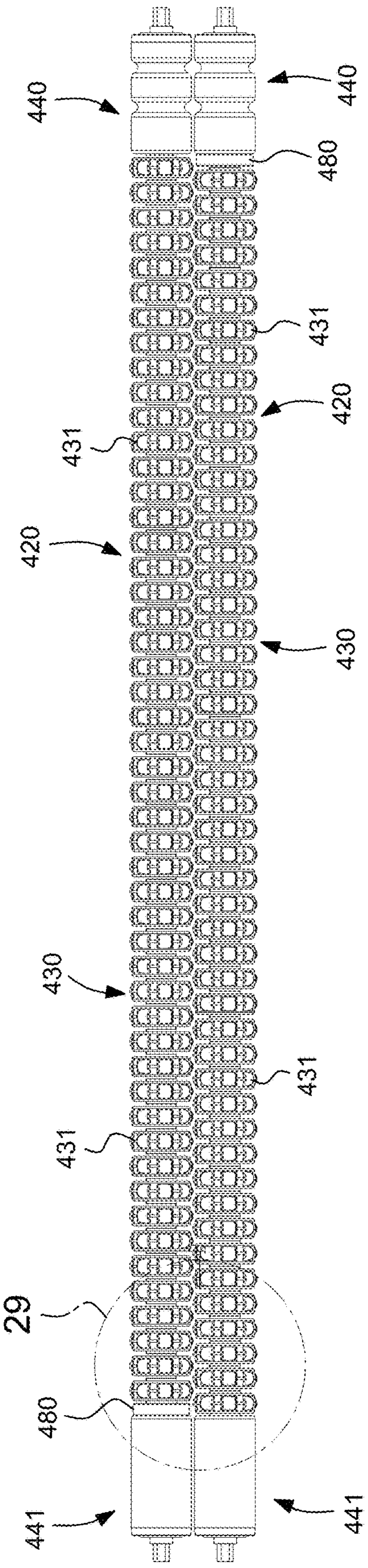
FIG. 26 is a top view of the pair of the bidirectional roller assemblies shown in FIG. 22, illustrating the offset alignment of the wheels associated with the roller centers being on the narrower spacing.

According to a second configuration of the invention, FIGS. 22 and 26 show a pair of the bidirectional roller assemblies 420 shown in FIG. 10, and illustrate the roller centers on a second, somewhat narrower, spacing. Because of the narrower spacing, the alignment of the bidirectional wheel assemblies 430 of the adjacent bidirectional roller assemblies 420 must be offset from one another. As best seen in FIG. 26, in this second configuration, the offset is achieved by insertion of the spacer 480, for a first bidirectional roller assembly 420, between the bidirectional wheel assembly 430 and the first hub assembly 440, and for a second bidirectional roller assembly 420, between the bidirectional wheel assembly 430 and the second hub assembly 441. See also FIG. 29, which is an enlarged left-hand top view of the pair of the bidirectional roller assemblies 420 shown in FIG. 22, and illustrates the offset alignment of the bidirectional wheels 431 associated with the roller centers being on the relatively narrower spacing.

Figure 23:
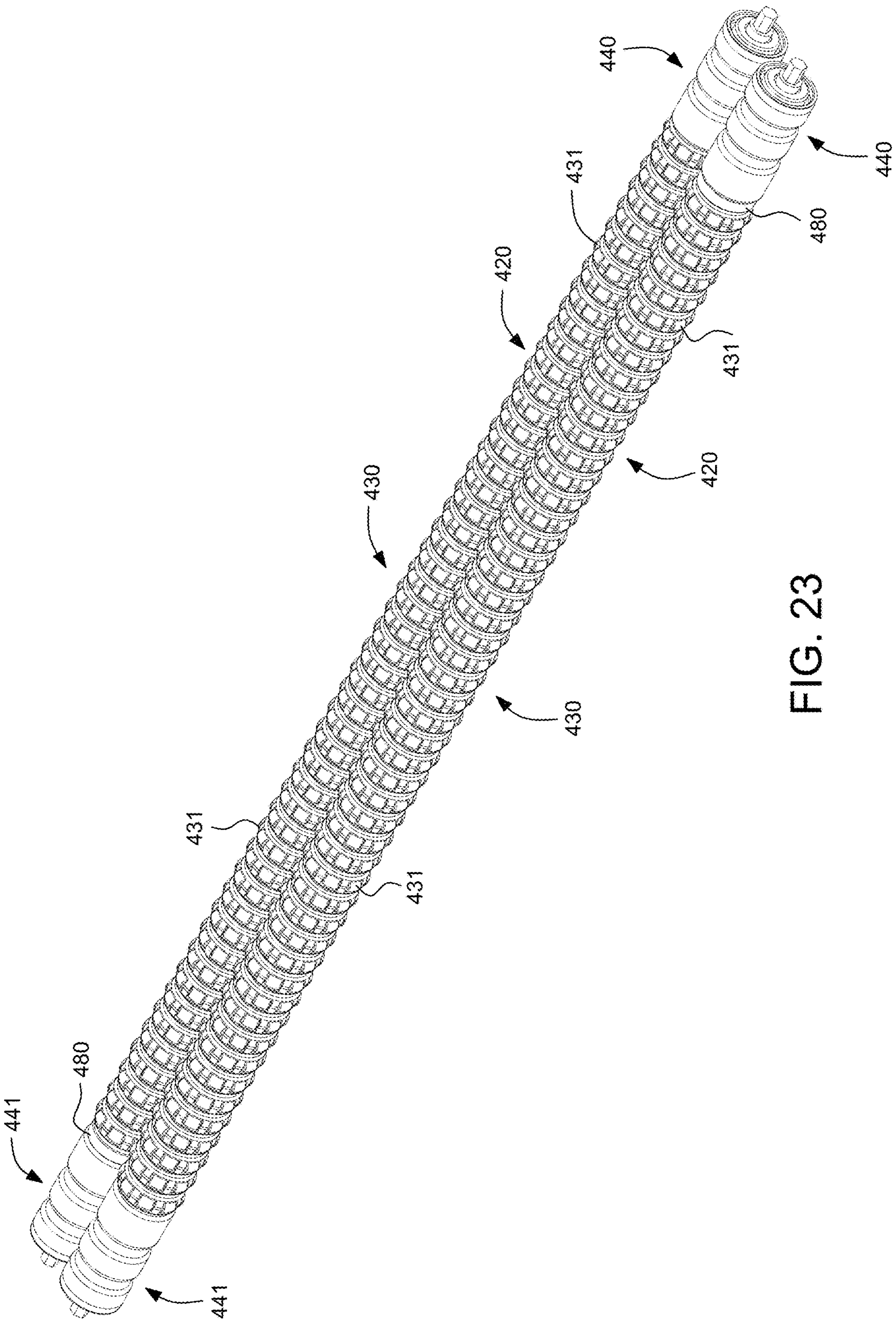
FIG. 23 is a perspective view of a pair of the bidirectional roller assemblies shown in FIG. 10, illustrating roller centers on a narrower spacing according to a third configuration of the invention.
Figure 27:
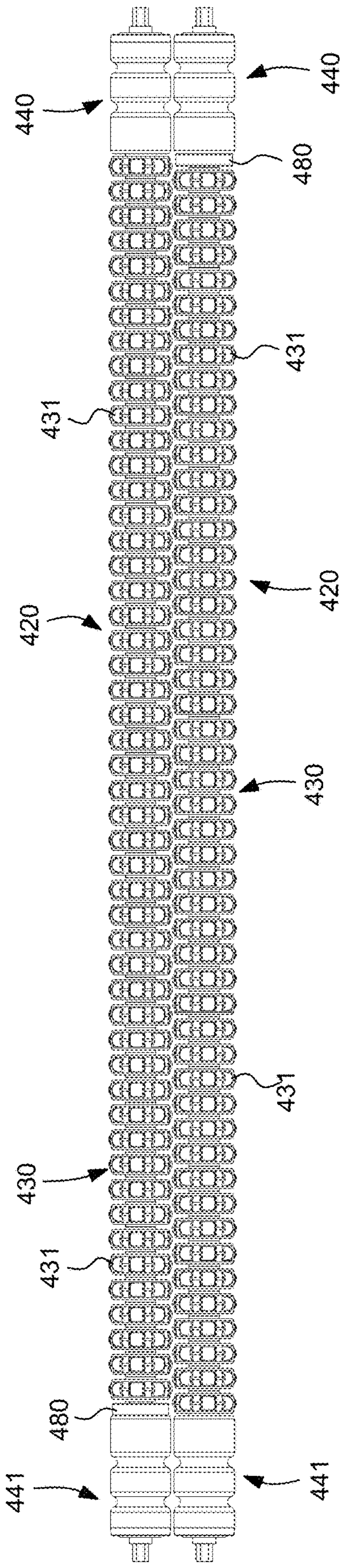
FIG. 27 is a top view of the pair of the bidirectional roller assemblies shown in FIG. 23, illustrating the offset alignment of the wheels associated with the roller centers being on the narrower spacing, and illustrating a hub assembly at each end of the roller.

According to a third configuration of the invention, FIGS. 23 and 27 show a pair of the bidirectional roller assemblies 420 shown in FIG. 10, and illustrate the roller centers on the aforementioned somewhat narrower spacing. According to the third configuration, both the first hub assembly 440 and the second hub assembly 441 include the grooves 442 within which the drive bands 140 travel. And, as with the above-described second configuration, the offset is achieved by insertion of the spacer 480, for a first bidirectional roller assembly 420, between the bidirectional wheel assembly 430 and the first hub assembly 440, and for a second bidirectional roller assembly 420, between the bidirectional wheel assembly 430 and the second hub assembly 441.

Figure 24:
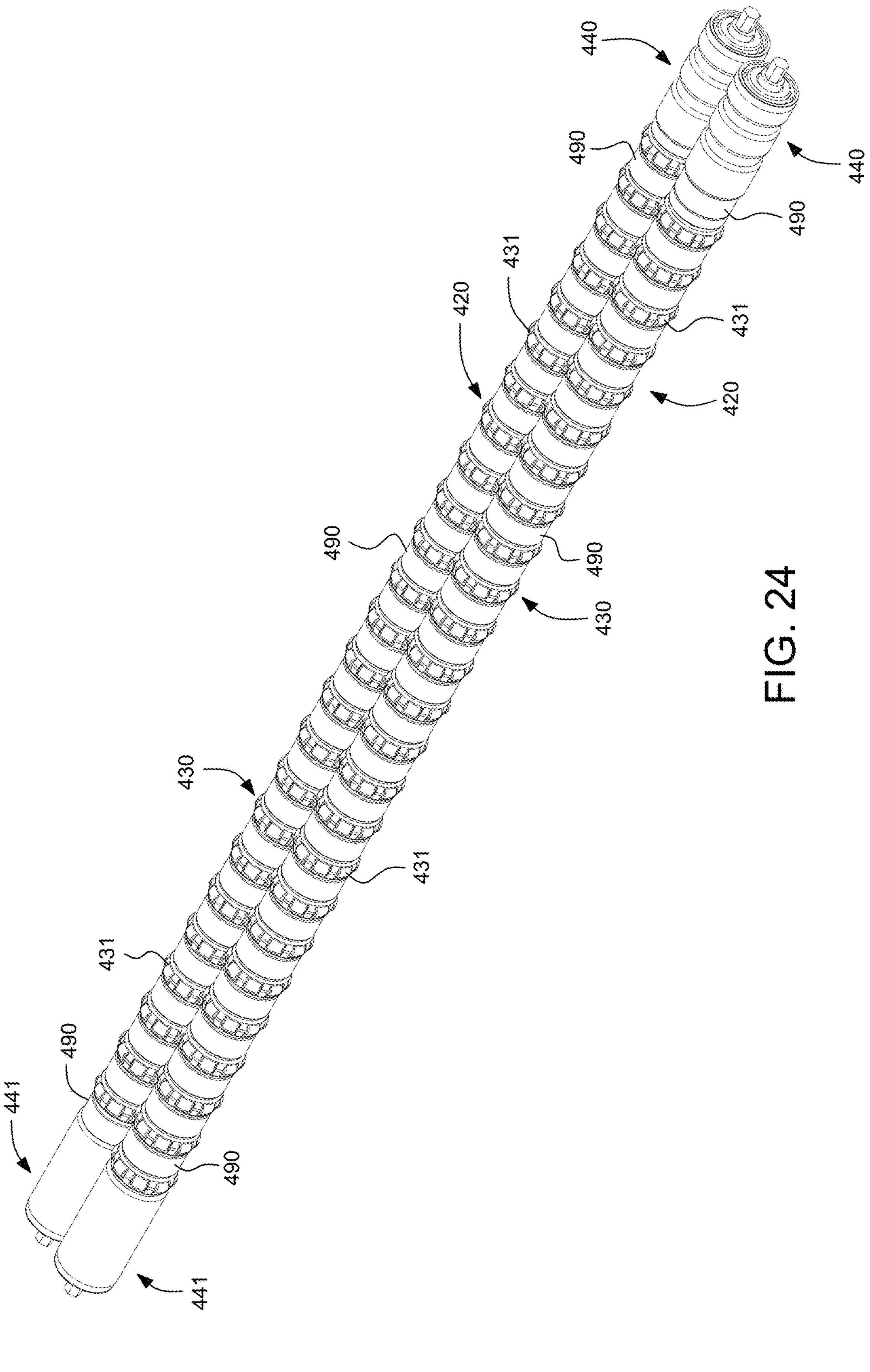
FIG. 24 is a perspective view of a pair of the bidirectional roller assemblies shown in FIG. 10, illustrating a fourth configuration of the invention having a reduced number of bidirectional wheels per roller, with a spacer between adjacent wheels.
Figure 28:
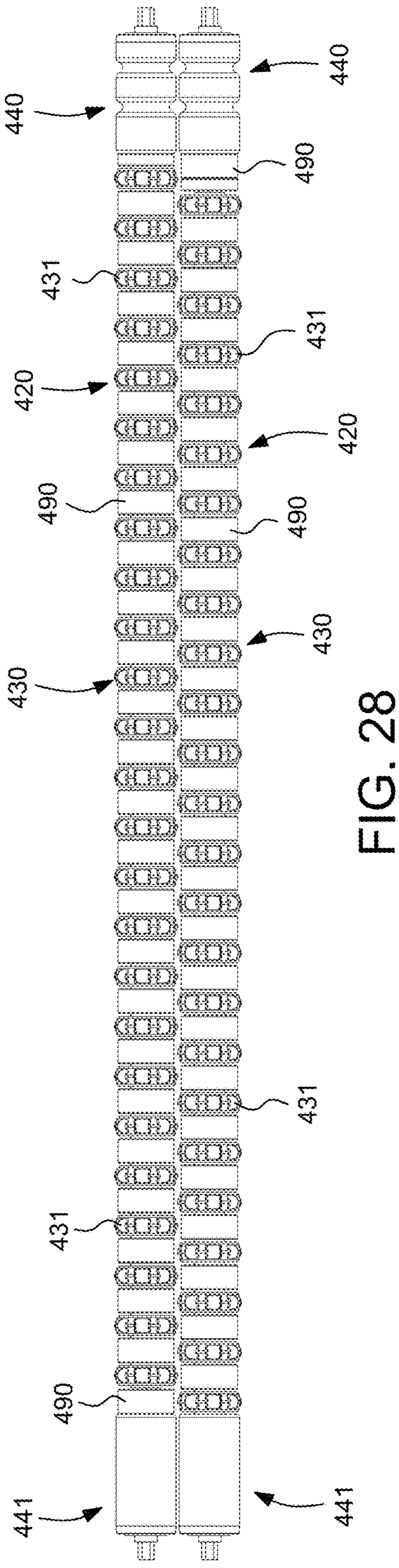
FIG. 28 is a top view of the pair of the bidirectional roller assemblies shown in FIG. 24, illustrating the offset alignment of the wheels associated with the roller centers being on the narrower spacing, and illustrating the spacer between adjacent wheels.
Figure 29:
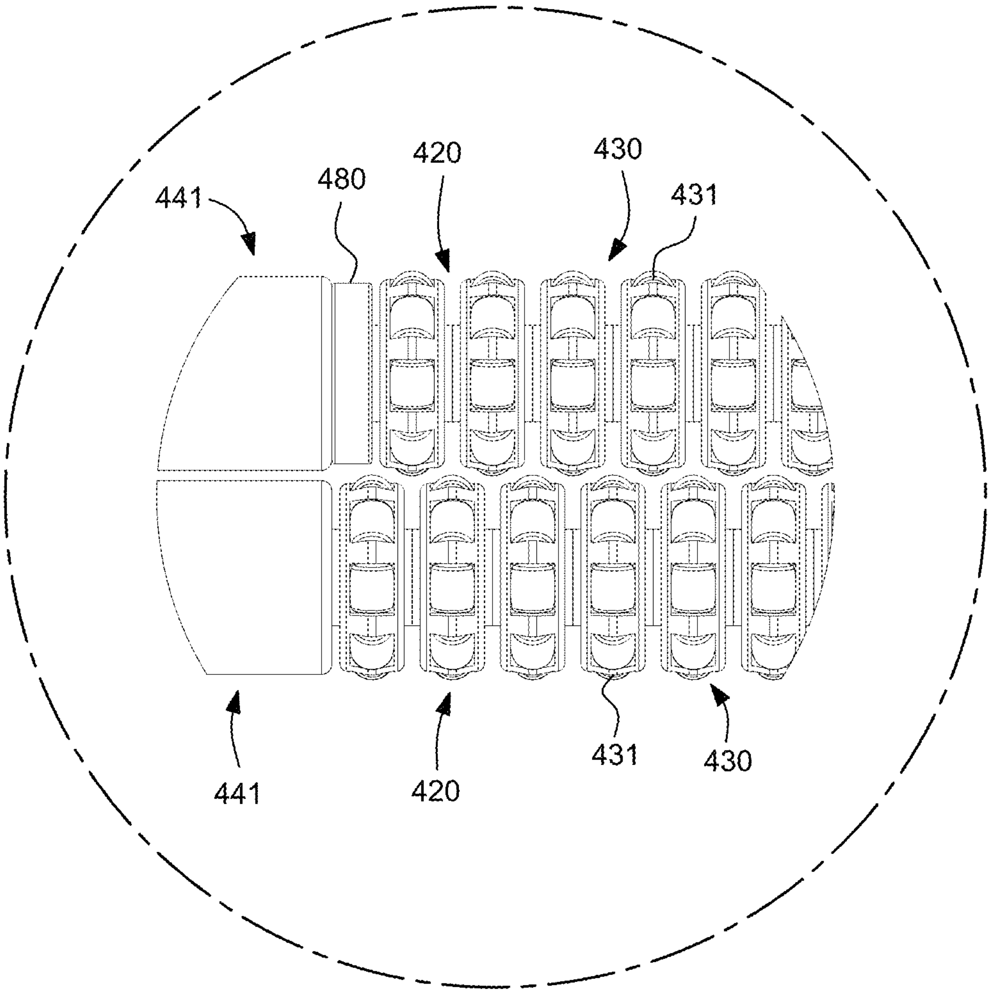
FIG. 29 is an enlarged top view of the pair of the bidirectional roller assemblies shown in FIG. 22, illustrating the offset alignment of the wheels associated with the roller centers being on the narrower spacing.

And, according to a fourth configuration of the invention, FIGS. 24 and 28 show a pair of the bidirectional roller assemblies 420 shown in FIG. 10, and illustrate a configuration having a reduced number of bidirectional wheels 431 per bidirectional wheel assembly 430, with a spacer 490 being positioned between each of the adjacent wheels 431. As with the above-described second and third configurations, because of the relative narrow spacing between bidirectional roller assemblies 420, the alignment of the bidirectional wheel assemblies 430 of the adjacent bidirectional roller assemblies 420 must be offset from one another. According to this fourth configuration of the invention, the offset is such that for the adjacent bidirectional roller assemblies 420, a bidirectional wheel 431 of one bidirectional roller assembly is positioned so as to be directly opposite from a spacer 490 of the other bidirectional roller assembly.

Now, turning again to the elements of the bidirectional roller assembly 420, as shown in, for example, FIGS. 10, 11A, and 12, according to the first embodiment of the present invention, the bidirectional roller assembly 420 includes a bidirectional wheel assembly 430 having a plurality of bidirectional wheels 431. And, as shown in, for example, FIGS. 16 and 17A, according to the second embodiment of the present invention, the bidirectional roller assembly 520 includes a bidirectional wheel assembly 530 having a plurality of bidirectional wheels 531. For the purpose of the following description of various structural elements of an individual bidirectional wheel, reference is made to bidirectional wheel 431, but it is to be understood that the description applies equally to bidirectional wheel 531.

Figure 39:
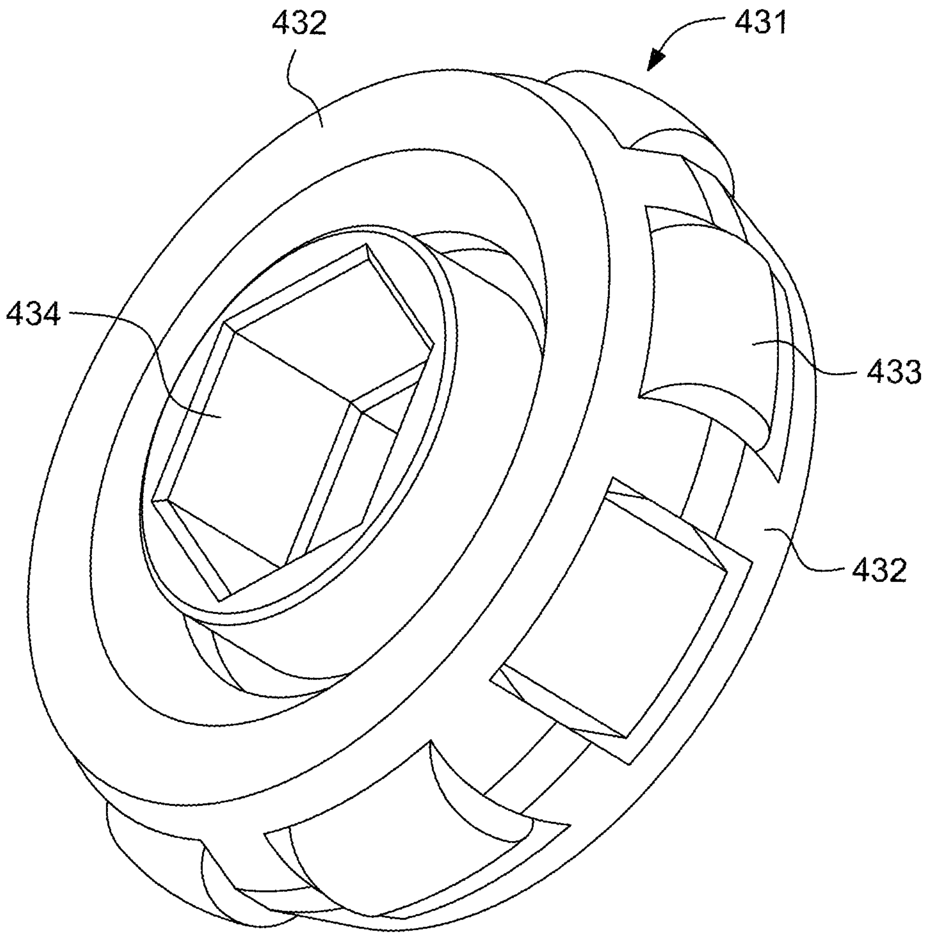
FIG. 39 is a perspective view of an embodiment of a bidirectional wheel associated with a bidirectional wheel assembly according to the present invention.
Figure 40:
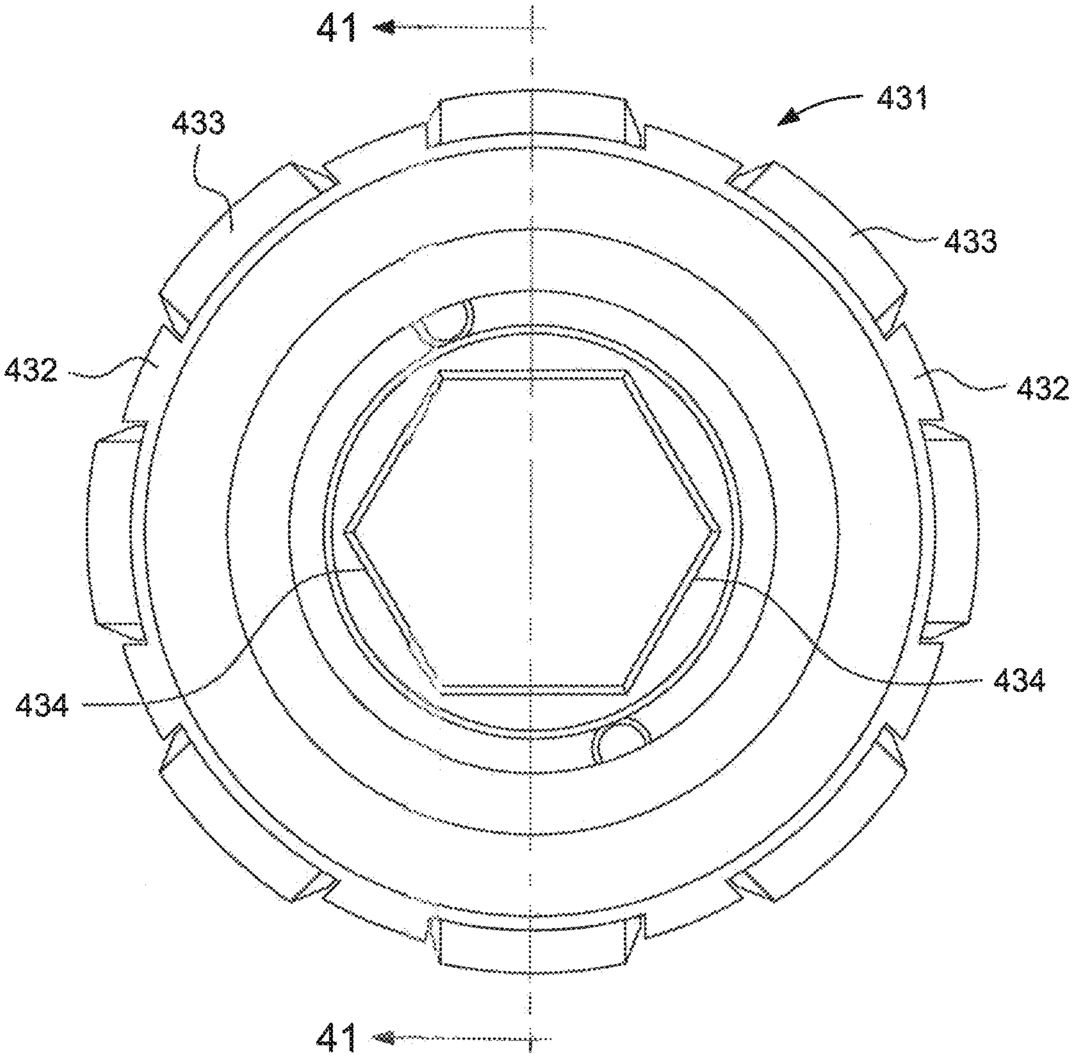
FIG. 40 is a side view of the bidirectional wheel shown in FIG. 39.
Figure 41:
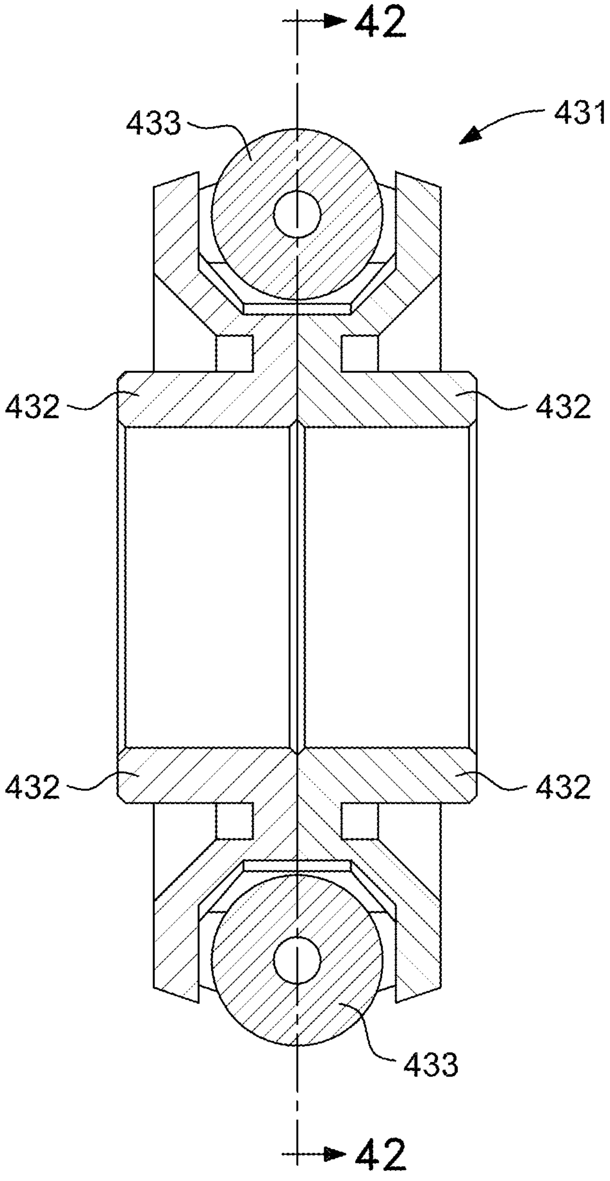
FIG. 41 is an end cross-sectional view of the bidirectional wheel shown in FIG. 39.

FIG. 39 is a perspective view of an embodiment of a bidirectional wheel 431 associated with a bidirectional wheel assembly 430 according to the present invention; FIG. 40 is a side view of the bidirectional wheel 431 shown in FIG. 39; and FIG. 41 is an end cross-sectional view of the bidirectional wheel 431 shown in FIG. 39. As shown in FIGS. 39, 40, and 41, the bidirectional wheel 431 according one embodiment of the present invention includes a wheel housing 432, a central opening 434 that is hexagonal in cross section, and a plurality of rotatable transverse rollers 433. The hexagonal central opening 434 is configured in size and shape for engagement of the bidirectional wheel 431 with the roller shaft 460 described herein having the hexagonal cross-sectional shape.

Figure 42:
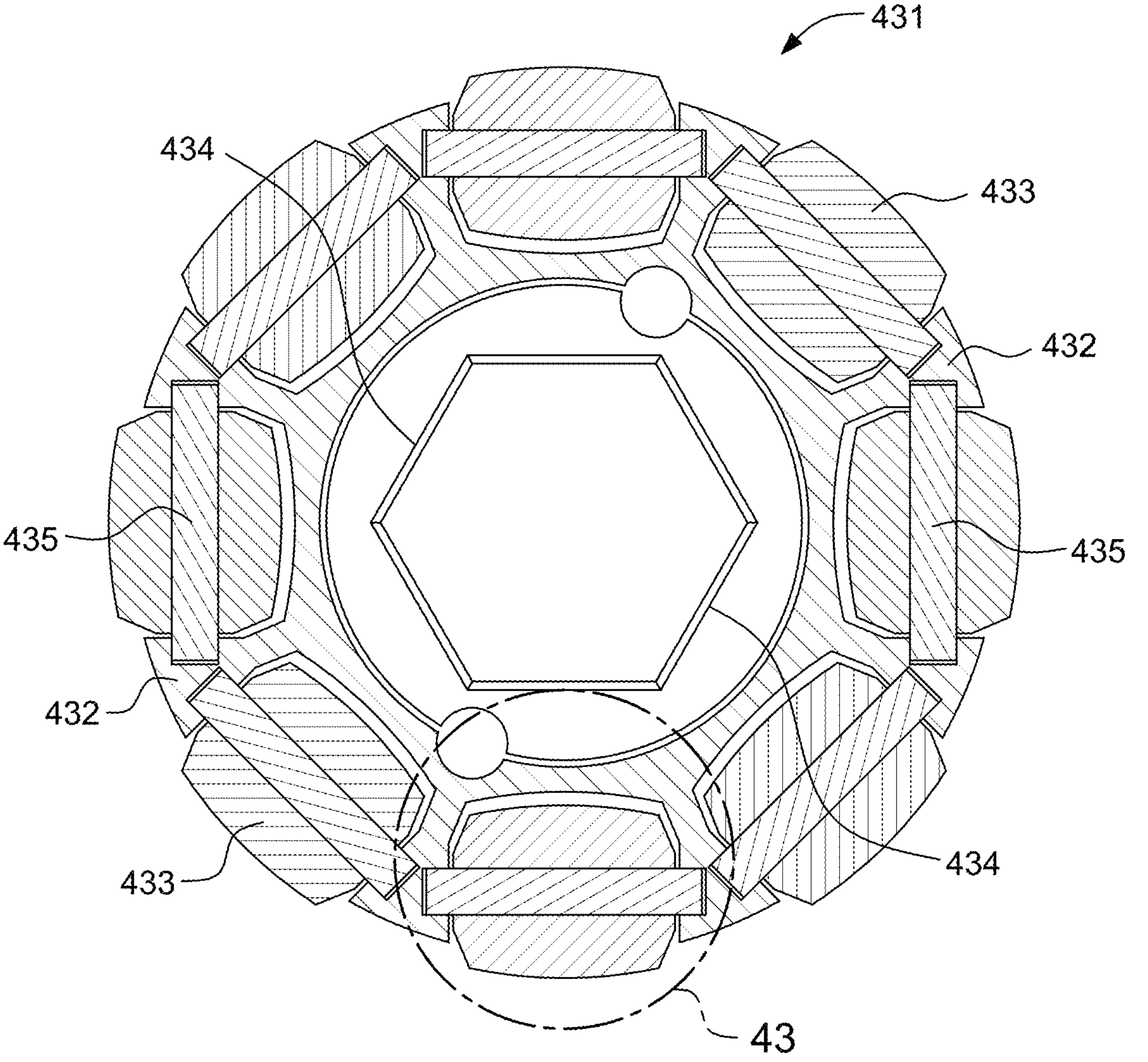
FIG. 42 is a side cross-sectional view of the bidirectional wheel shown in FIG. 39.
Figure 43:
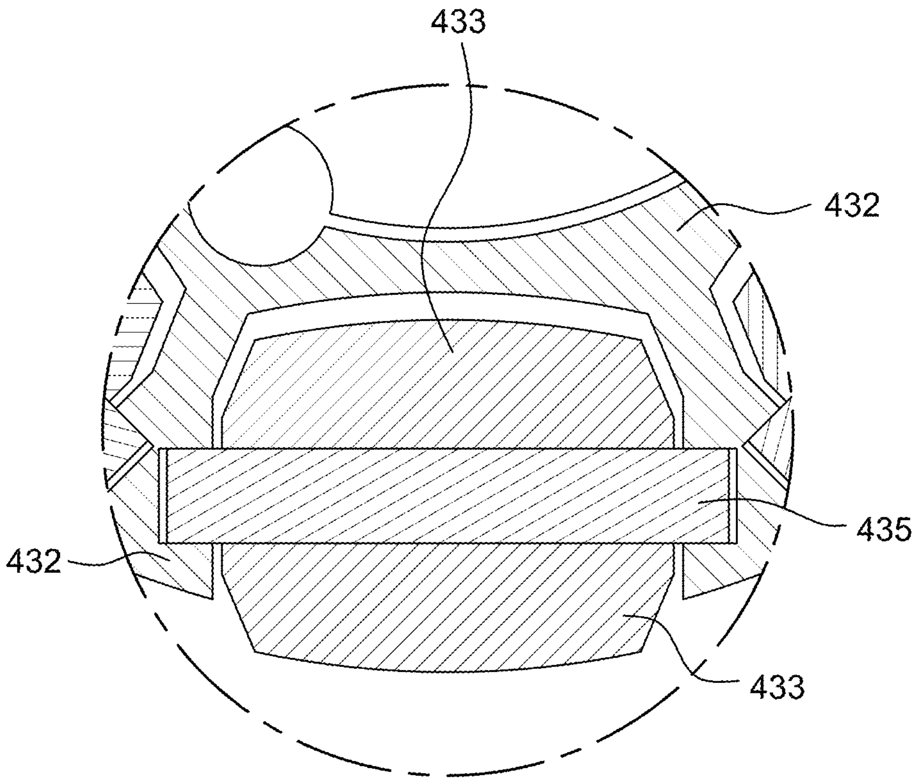
FIG. 43 is an enlarged partial side cross-sectional view illustrating a rotatable transverse roller and transverse axle shaft of the bidirectional wheel shown in FIG. 42.

FIG. 42 is a side cross-sectional view of the bidirectional wheel 431 shown in FIG. 39, and illustrates the plurality of rotatable transverse rollers 433 and a corresponding plurality of transverse axle shafts 435. FIG. 43 is an enlarged partial side cross-sectional view illustrating the rotatable transverse roller 433 and its corresponding transverse axle shaft 435.

As is evident from the above description and from FIGS. 39, 40, 41, 42, and 43, each of the plurality of rotatable bidirectional wheels 431 is configured to provide rotation for transport of a conveyed item in a conveyor transport direction, and to provide, via the plurality of rotatable transverse rollers 433 and the corresponding plurality of transverse axle shafts 435, rotation for transport of a conveyed item in a diversion direction.

According to a preferred embodiment of the bidirectional wheel 431, 531, the bidirectional wheel preferably has an overall outside diameter of approximately 2.008 inches (i.e., 51 mm). Specifying the overall outside diameter of the bidirectional wheel as 2.008 inches (51 mm) is to facilitate use of the inventive repositionable bidirectional roller assembly with a roller conveyor that employs unidirectional rollers having a 1.9 inch roller diameter.

The bidirectional wheel preferably includes eight (8) of the rotatable transverse rollers 433 and a corresponding number, i.e., eight (8), of the transverse axle shafts 435. The material of construction of the wheel housing 432 is preferably a polyoxymethylene ("POM"), also known as an acetal. The material of construction of the rotatable transverse roller 433 is preferably a high density polyethylene ("HDPE"), and the material of construction of the transverse axle shaft 435 is preferably a metal that is galvanized or zinc coated.

The structural and functional benefits and advantages associated with the above-described bidirectional wheel 431, 531 according to the present invention are numerous. First, by virtue of the material of construction of the wheel housing 432 being a polyoxymethylene, the wheel housing exhibits various desirable characteristics, including wear resistance, low friction, and high thermal stability. Second, by virtue of the material of construction of the transverse axle shaft 435 being a metal that is galvanized or zinc coated, rotation of the rotatable transverse roller 433 about the transverse axle shaft 435 is enhanced.

And third, with regard to the size of the bidirectional wheel 431, 531, i.e., having a preferred overall outside diameter of 2.008 inches (51 mm), there are additional advantages. The diameter of the bidirectional wheel 431, 531 is larger than the diameter of the unidirectional roller that it is replacing when the repositionable bidirectional roller assembly 420 according to the present invention is inserted in a roller conveyor. Accordingly, when a diverted item is pushed across the hub assembly of the repositionable bidirectional roller assembly 420, which hub assembly has the same diameter as that of the unidirectional roller it has replaced, the amount of contact between the diverted item and the hub assembly is reduced.

The present invention is also directed to a method of reconfiguring a unidirectional roller conveyor 100 to include therein a plurality of positionable bidirectional roller assemblies 420. As with the above description of the various configurations shown in FIGS. 21-29, the following description of the method is made with reference to bidirectional roller assembly 420 and its associated 400-series structural elements as described herein. However, it is to be understood that the same description is applicable to bidirectional roller assembly 520 and its associated 500-series structural elements.

Figure 30:
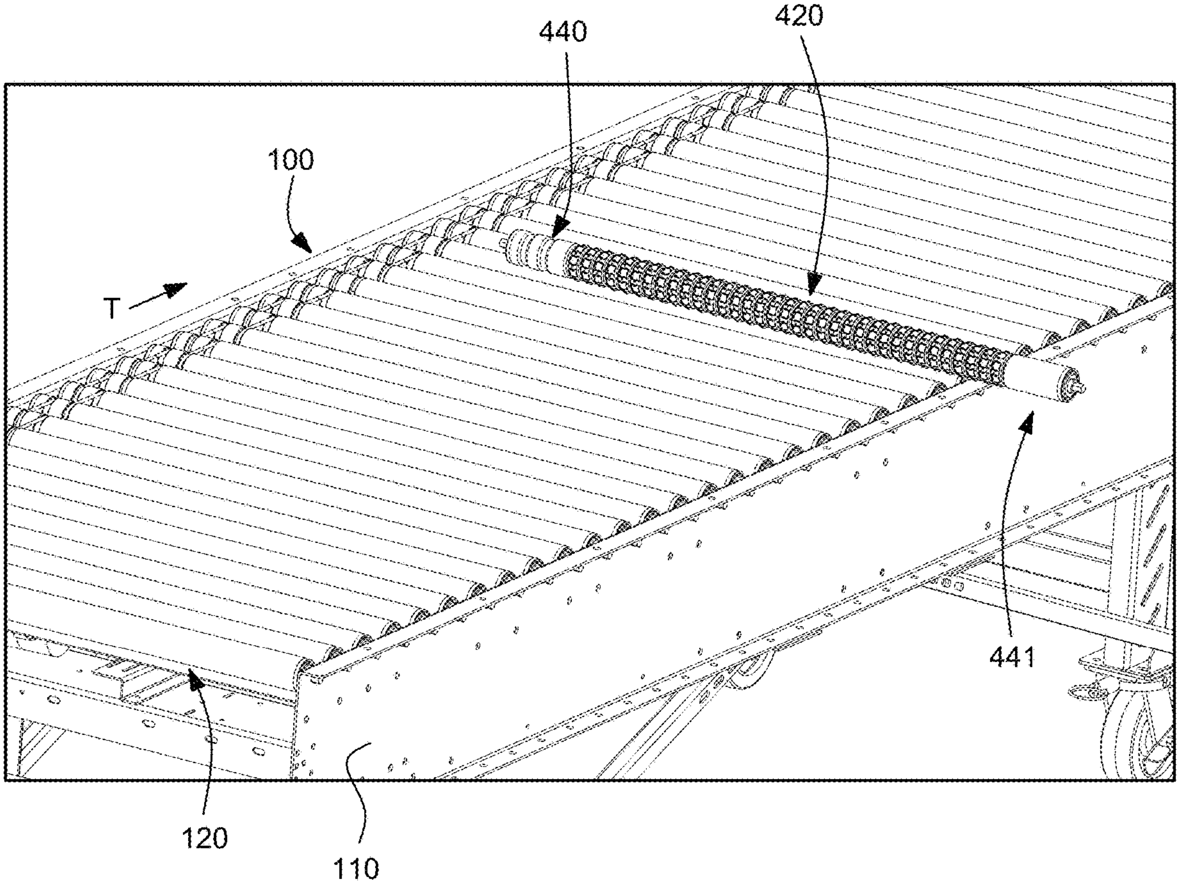
FIG. 30 is the first of a series of views showing the method of replacing a prior art unidirectional roller assembly with a bidirectional roller assembly according to the present invention, and illustrates the step of placing the bidirectional roller assembly of the present invention in the proximity of the prior art unidirectional roller conveyor.

FIGS. 30, 31, 32, 33, 34, 35, 36, 37, and 38 illustrate a method of reconfiguring the unidirectional roller conveyor 100 in four steps. As shown in FIG. 30, a first step in a series of steps of replacing a prior art unidirectional roller assembly 120 with a bidirectional roller assembly 420 according to the present invention is that of an operator providing the bidirectional roller assembly 420 in the proximity of the unidirectional roller conveyor 100.

Figure 31:
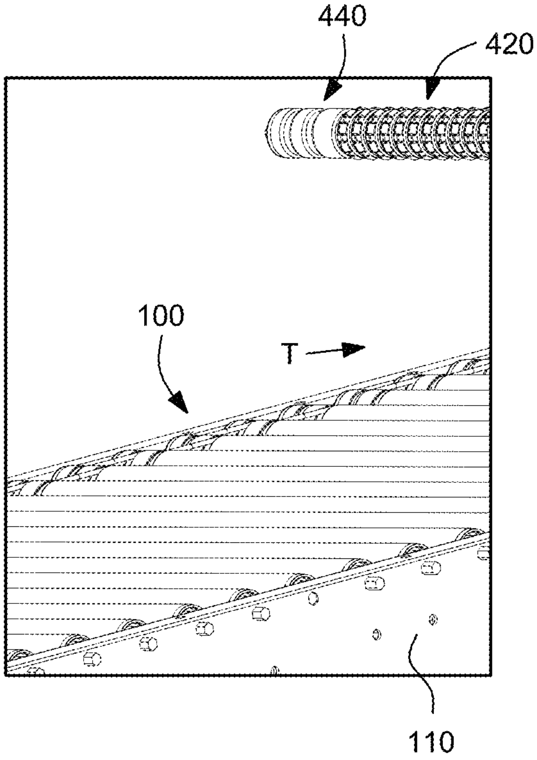
FIG. 31 is the second of the series of views showing the method of replacing the prior art unidirectional roller assembly with a bidirectional roller assembly according to the present invention, and illustrates the step of depressing an end of a hub assembly shaft of the unidirectional roller conveyor so as to disengage the end from the conveyor frame.
Figure 32:
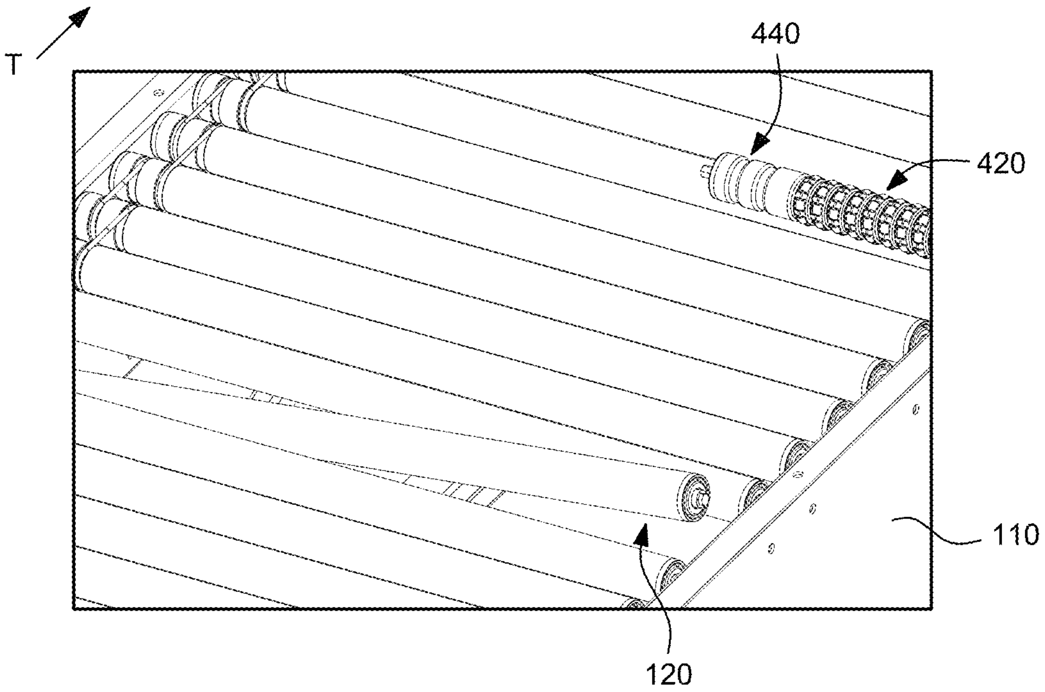
FIG. 32 is the third of the series of views showing the method of replacing the prior art unidirectional roller assembly with a bidirectional roller assembly according to the present invention, and illustrates the step of tilting up the disengaged end of the unidirectional roller assembly.

The second step is removal of the unidirectional roller assembly 120 at a location where the bidirectional roller assembly 420 of the present invention is to be inserted. As shown in FIG. 31, the operator manually depresses an end of a hub assembly shaft of the unidirectional roller assembly 120 so as to disengage the end from the conveyor frame 110. The operator then can tilt up and away from the frame 110 the disengaged end of the unidirectional roller assembly 120.

Figure 33:
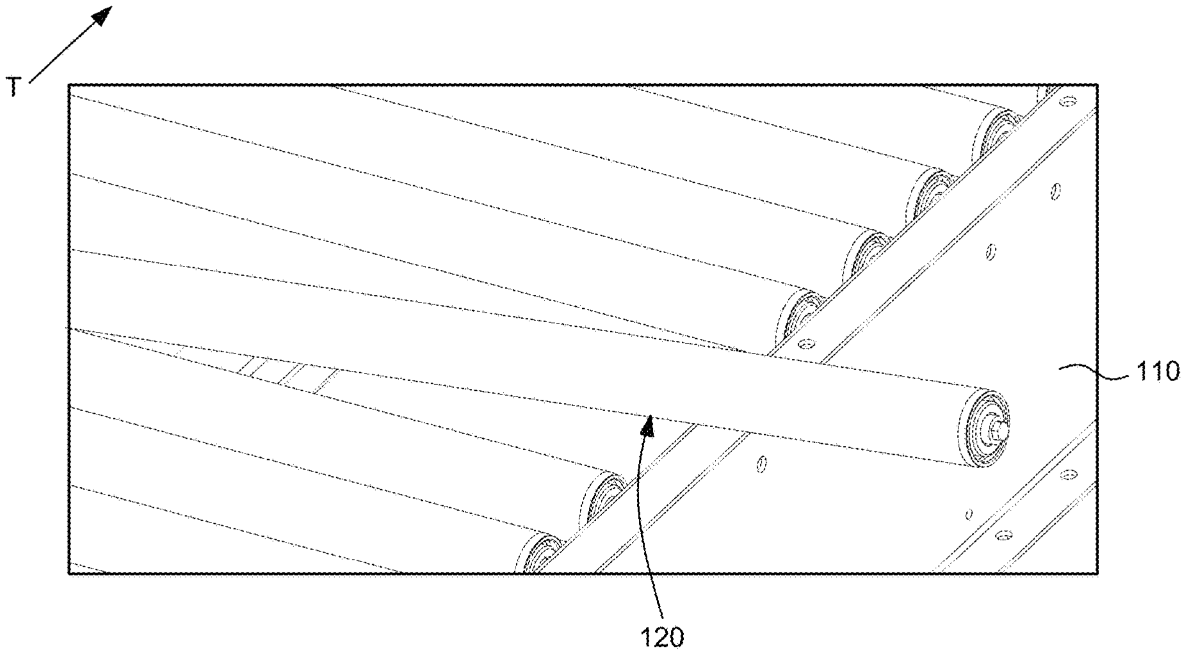
FIG. 33 is the fourth of the series of views showing the method of replacing the prior art unidirectional roller assembly with a bidirectional roller assembly according to the present invention, and illustrates the step of removing the disengaged unidirectional roller assembly from the conveyor frame.

Thereafter, as shown in FIG. 33, with one end of the unidirectional roller assembly 120 free of a near (i.e., relative to the operator's position) side of the conveyor frame 110, the operator can pull on the unidirectional roller assembly 120 to remove the far (i.e., again, relative to the operator's position) end of the unidirectional roller assembly 120 from the far side of the conveyor frame 110, and thus fully removing the disengaged unidirectional roller assembly 120 from the conveyor frame 110.

Figure 34:
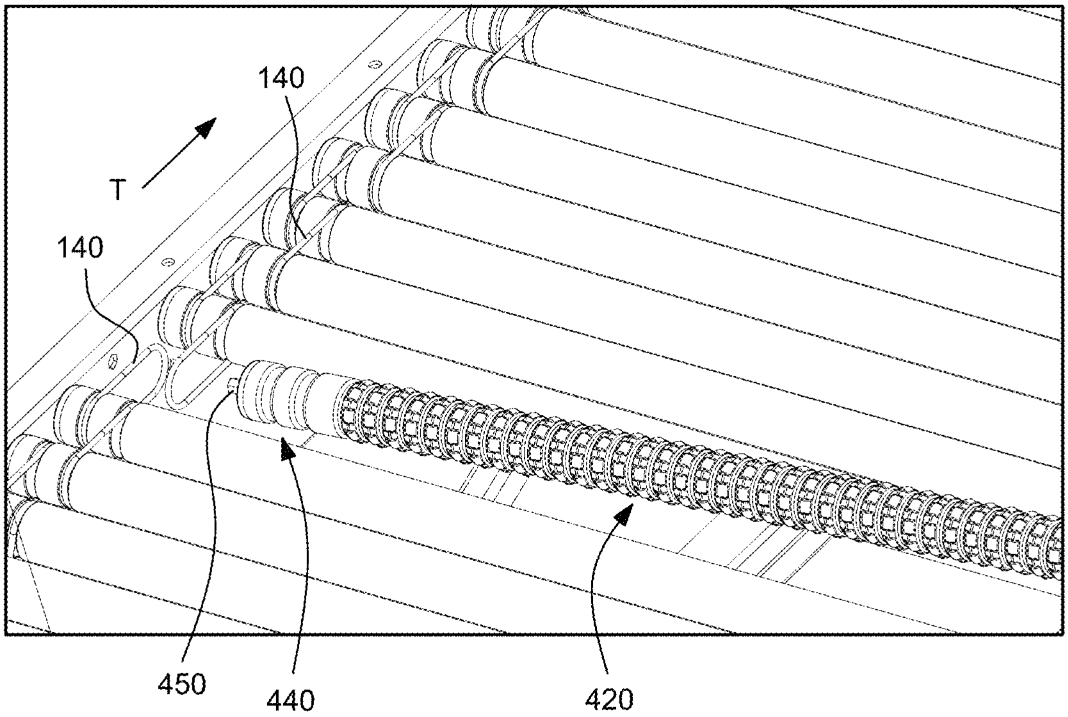
FIG. 34 is the fifth of the series of views showing the method of replacing the prior art unidirectional roller assembly with a bidirectional roller assembly according to the present invention, and illustrates the step of positioning an end of a hub assembly shaft of the bidirectional roller assembly near the conveyor frame.
Figure 35:
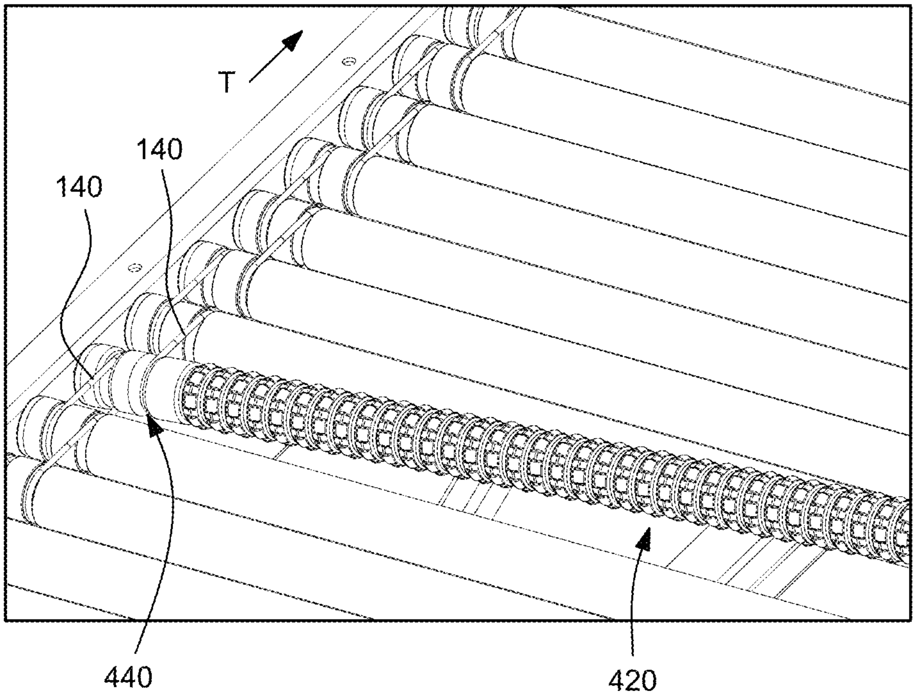
FIG. 35 is the sixth of the series of views showing the method of replacing the prior art unidirectional roller assembly with a bidirectional roller assembly according to the present invention, and illustrates the step of inserting the end of the hub assembly shaft at a first end of the bidirectional roller assembly into the conveyor frame and engaging drive bands.

Now, with an open space in the unidirectional roller conveyor 100, the inventive bidirectional roller assembly 420 can be inserted into the conveyor frame 110 as the third and fourth steps. As shown in FIG. 34, the operator positions the end of hub assembly shaft 450 associated with hub assembly 440 of the bidirectional roller assembly 420 near the far side of the conveyor frame 110. Then, as shown in FIG. 35, the operator inserts the end of the hub assembly shaft 450 under the drive bands 140 and into the far side of the conveyor frame 110, with each of the drive bands 140 being positioned in a respective groove 442.

Figure 36:
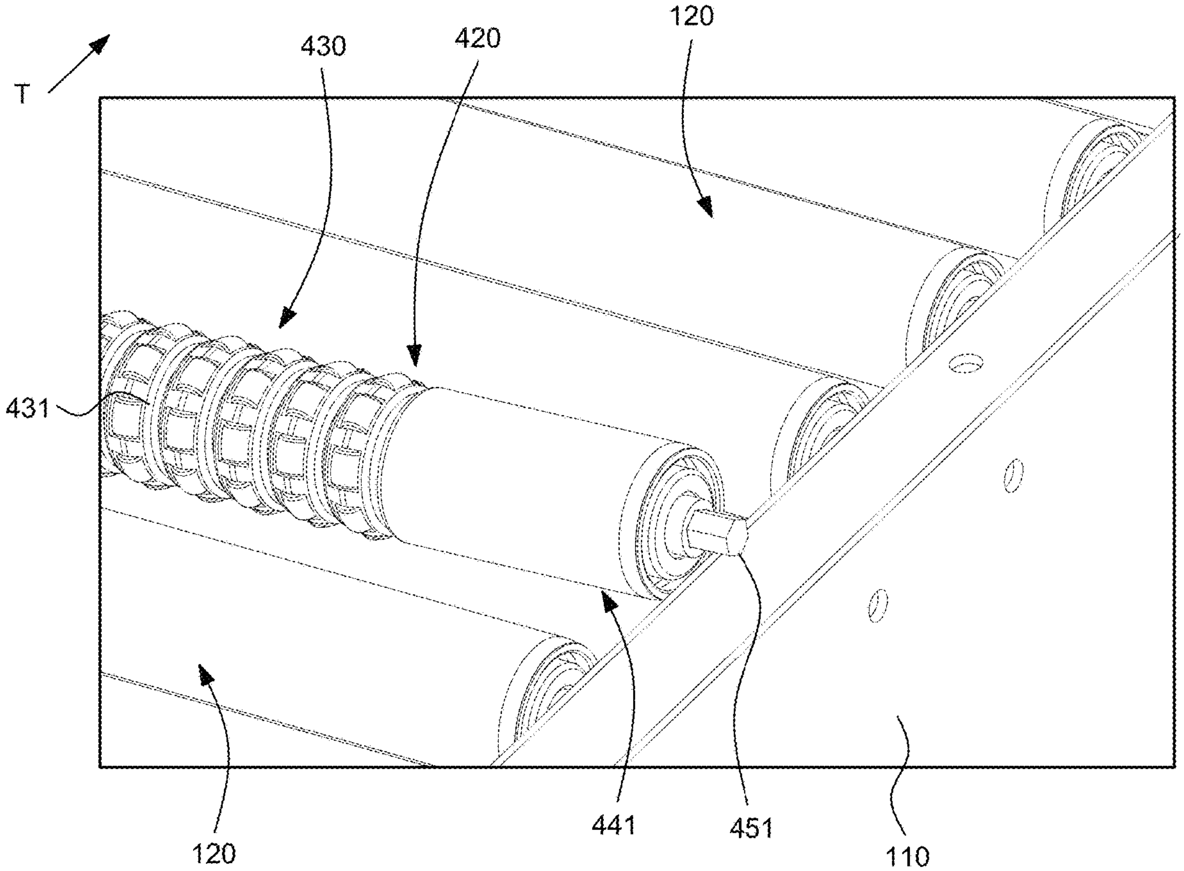
FIG. 36 is the seventh of the series of views showing the method of replacing the prior art unidirectional roller assembly with a bidirectional roller assembly according to the present invention, and illustrates the step of lowering a second end of the bidirectional roller assembly toward the conveyor frame.
Figure 37:
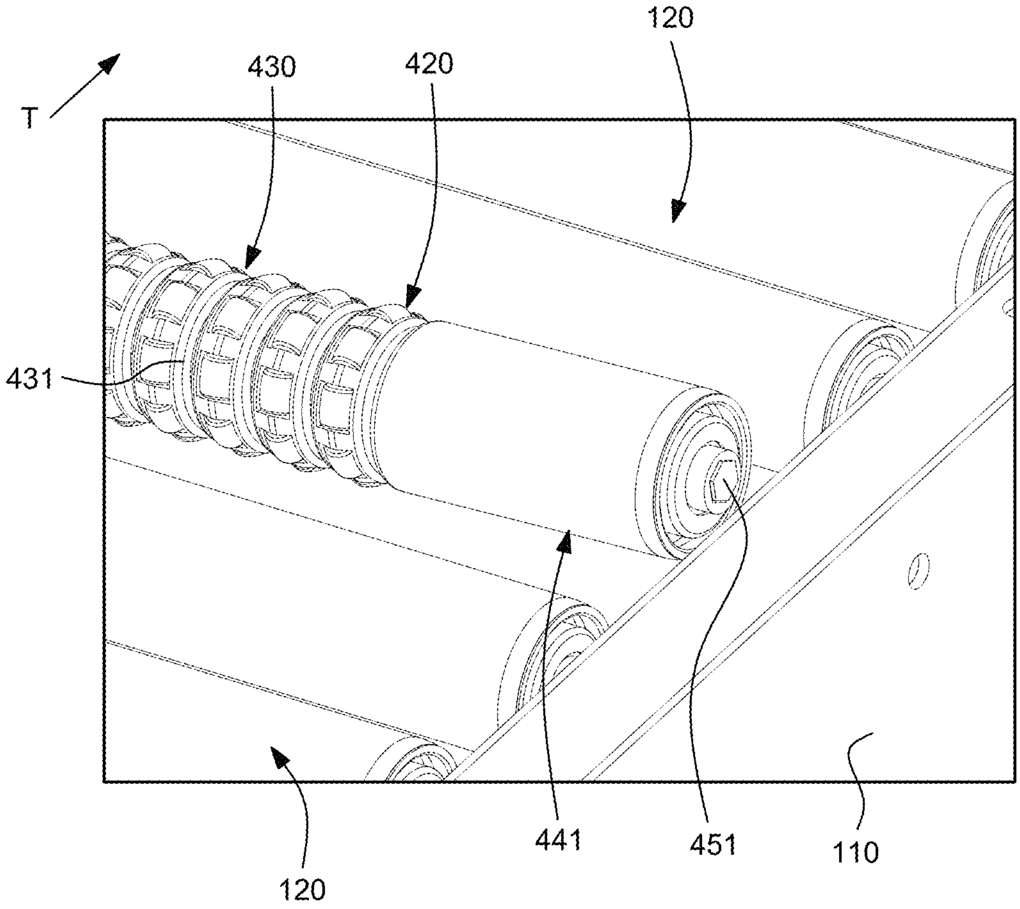
FIG. 37 is the eighth of the series of views showing the method of replacing the prior art unidirectional roller assembly with a bidirectional roller assembly according to the present invention, and illustrates the step of depressing the end of the hub assembly shaft at the second end of the bidirectional roller assembly for insertion into the conveyor frame.

Now, with the end of hub assembly shaft 450 associated with hub assembly 440 being secured in the far side of the conveyor frame 110, as shown in FIG. 36, the fourth step is that of the operator lowering the near end of the bidirectional roller assembly 420, i.e., the end associated with hub assembly 441, toward the conveyor frame 110. Next, as shown in FIG. 37, the operator manually depresses the end of the hub assembly shaft 451 at the near end of the bidirectional roller assembly 420, i.e., again, the end associated with hub assembly 441, for insertion into the conveyor frame 110.

More specifically, after depressing the end of the hub assembly shaft 451, the operator lowers the bidirectional roller assembly 420 into the conveyor frame 110, and manually releases the spring-actuated end of the hub assembly shaft 451. By virtue of the spring-actuated feature of the hub assembly 441, the hub assembly shaft 451 extends to its original, i.e., non-compressed, position so as to be secured in the near side of conveyor frame 110.

Figure 38:
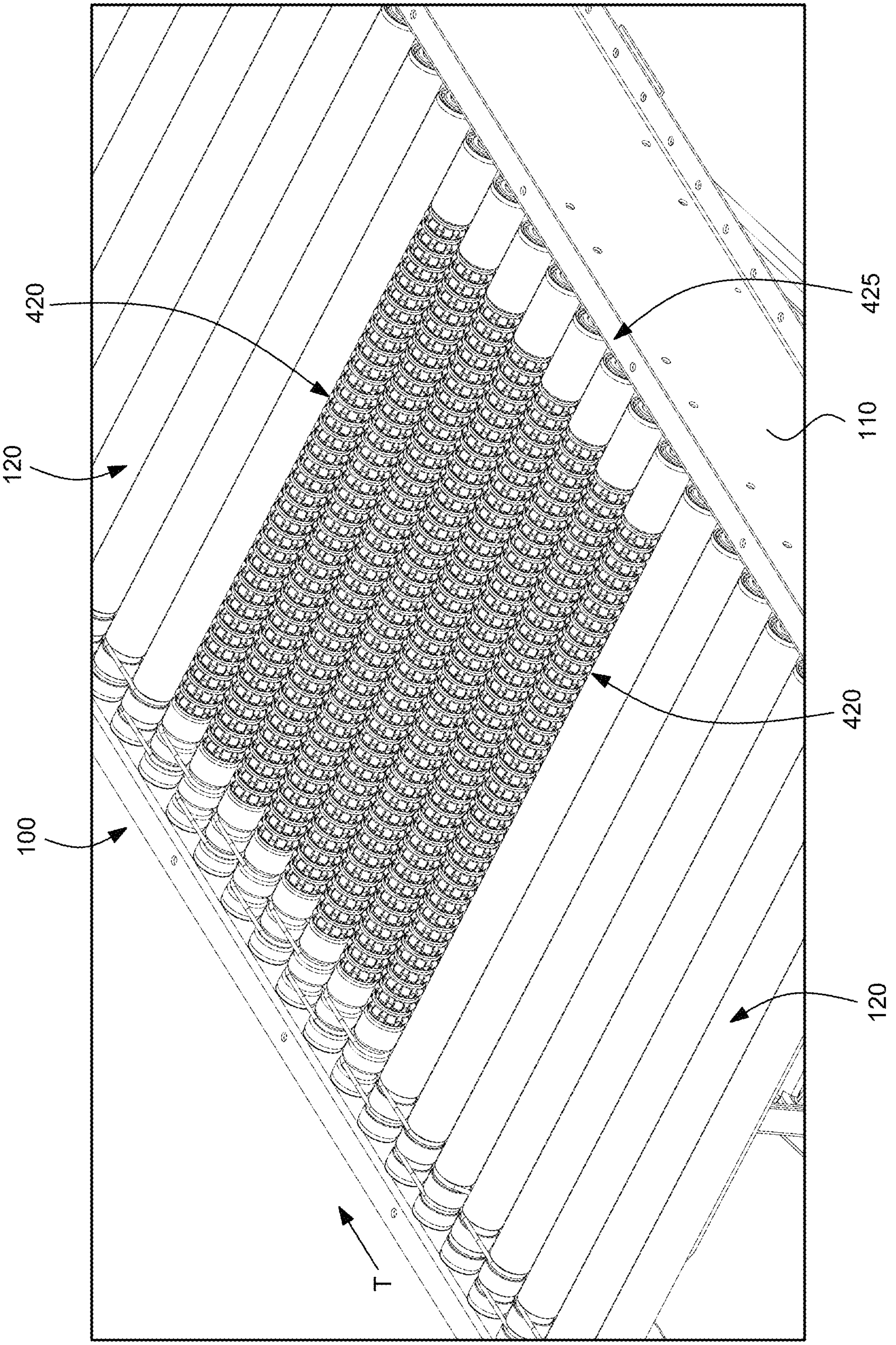
FIG. 38 is the ninth of the series of views showing the method of replacing the prior art unidirectional roller assembly with a bidirectional roller assembly according to the present invention, and a illustrates a plurality of adjacent bidirectional roller assemblies installed in the prior art unidirectional roller conveyor so as to provide for the diversion of conveyed items.

Thus, upon completing the above-described steps of reconfiguring the unidirectional roller conveyor 100, FIG. 38 illustrates a plurality of adjacent bidirectional roller assemblies 420 installed in the unidirectional roller conveyor 100 so as to provide a structure, and a method, for the easy diversion of conveyed items therefrom by simply pushing them off of the conveyor.

And, although FIG. 38 shows a single bidirectional roller assembly section 425 consisting of eight (8) adjacent assemblies 420, as one skilled in the art would appreciate, a bidirectional roller assemblies section 425 may have fewer or more assemblies than the number shown. It is presently believed that a desirable bidirectional roller assembly section 425 should have from about six (6) to about eighteen (18) bidirectional roller assemblies 420, depending, of course, upon the particular service requirement of the conveyor. And, the conveyor may have multiple spaced apart sections 425 of the bidirectional roller assemblies 420.

In summary, as is evident from the above, the advantages provided by the repositionable bidirectional roller assembly of the present invention are numerous. The bidirectional roller assembly includes bidirectional wheels that enable the diversion of conveyed items from the conveyor in a diversion direction that is different from that of the transport direction of the conveyor. The bidirectional roller assembly includes a plurality of driven bidirectional wheels that rotate both in the conveyor transport direction and in the diversion direction, and a hub assembly having a reversibly compressible shaft at both ends of the bidirectional roller assembly. Each of the plurality of rotatable bidirectional wheels is configured to provide rotation for transport of a conveyed item in the conveyor transport direction, and to provide rotation for transport of a conveyed item in the diversion direction. The compressibility of both of the hub assembly shafts enables the bidirectional roller assembly to easily be inserted into, and removed from, an existing conveyor. By virtue of the reversibly compressible hub assembly shaft, the invention provides operational flexibility, since any bidirectional roller assembly can easily be removed from a given position and reinserted in the conveyor at a desired different position, thus enabling the diversion of conveyed items to be attained at any point along the length of the conveyor.

The foregoing description, and the drawings, are considered as illustrative only of the principles of the present invention. For example, depending upon certain features of the conveyor drive system, the bidirectional roller assembly 420 may have machined grooves 442 in either one or both of the hub assemblies 440 and 441. Similarly, with respect to the drive bands, the bands could be any of a round band such as band 140, or a V belt, or the described Poly-V type belt. And, in general, other structural elements or method steps of the present invention may be different from that described herein as long as the use of the different elements or steps is consistent with the principles of operation described herein.

Furthermore, since numerous modifications and changes may readily occur to those skilled in the art, it is not desired to limit the invention to the exact construction and operation described and shown.

What is claimed is:

1. A repositionable bidirectional roller assembly for use in a roller conveyor, said repositionable bidirectional roller assembly comprising:

- a plurality of bidirectional wheels that rotate both in a conveyor transport direction and in a diversion direction, and a first and a second hub assembly each having a reversibly compressible hub assembly shaft to facilitate a repositioning of the bidirectional roller assembly within the roller conveyor; and
- a roller shaft having a first roller shaft end in connection with the first hub assembly and a second roller shaft end in connection with the second hub assembly.

2. The repositionable bidirectional roller assembly according to claim 1, wherein the first hub assembly is a drive hub assembly configured to be rotatably driven, and the second hub assembly is a non-drive hub assembly.

3. The repositionable bidirectional roller assembly according to claim 1, wherein the first roller shaft end is threaded so as to be threadably connectable to a threaded section of the first hub assembly, and the second roller shaft end is threaded so as to be threadably connectable to a threaded section of the second hub assembly.

4. The repositionable bidirectional roller assembly according to claim 3, wherein the roller shaft rotates as the first hub assembly is rotatably driven.

5. The repositionable bidirectional roller assembly according to claim 1, wherein the first hub assembly includes a hub, with at least one groove in an outer surface thereof configured to receive a drive member for driving the first hub assembly.

6. The repositionable bidirectional roller assembly according to claim 5, wherein the drive member is a drive band or a Poly-V drive belt.

7. The repositionable bidirectional roller assembly according to claim 1, wherein the first hub assembly includes the reversibly compressible first hub shaft, a spring configured to return the first hub shaft to a non-compressed position, a bearing which supports a first end of the first hub shaft and a bearing to support a second end of the first hub shaft.

8. The repositionable bidirectional roller assembly according to claim 7, wherein the first hub shaft includes a groove which houses a retainer ring configured to prevent, upon decompression of the spring, the first hub shaft from extending outwardly beyond a non-compressed position.

9. The repositionable bidirectional roller assembly according to claim 1, wherein the repositionable bidirectional roller assembly includes a self-contained spring loaded bearing shaft assembly.

10. The repositionable bidirectional roller assembly according to claim 1, wherein the repositionable bidirectional roller assembly includes a first drive hub assembly, and a first self-contained spring loaded bearing shaft assembly having a reversibly compressible first hub shaft, and a second non-drive hub assembly, and a second self-contained spring loaded bearing shaft assembly having a reversibly compressible second hub shaft.

11. The repositionable bidirectional roller assembly according to claim 1, wherein the roller shaft is hexagonal in cross section.

12. The repositionable bidirectional roller assembly according to claim 1, wherein the reversibly compressible shaft of each of the first hub assembly and the second hub assembly is hexagonal in cross section.

13. The repositionable bidirectional roller assembly according to claim 1, wherein the diversion direction is substantially perpendicular to the conveyor transport direction.

14. The repositionable bidirectional roller assembly according to claim 1, wherein a bidirectional wheel assembly includes one or a plurality of the bidirectional wheels.

15. The repositionable bidirectional roller assembly according to claim 14, further comprising a spacer positioned between the bidirectional wheel assembly and the first hub assembly, or between the bidirectional wheel assembly and the second hub assembly, or between the bidirectional wheel assembly and the first hub assembly and between the bidirectional wheel assembly and the second hub assembly, or between adjacent bidirectional wheels.

16. The repositionable bidirectional roller assembly according to claim 1, wherein each of the plurality of bidirectional wheels includes a wheel housing, a central opening that is hexagonal in cross section, a plurality of rotatable transverse rollers, and a corresponding plurality of transverse roller axle shafts.

17. The repositionable bidirectional roller assembly according to claim 16, wherein each of the plurality of rotatable transverse rollers rotates about the corresponding plurality of transverse roller axle shafts in the diversion direction.

18. The repositionable bidirectional roller assembly according to claim 16, wherein each of the plurality of bidirectional wheels includes eight of the rotatable transverse rollers.

19. A roller conveyor configured to transport conveyed items along a transport path, and to divert certain of the conveyed items therefrom along a diversion path, said roller conveyor comprising:

a plurality of repositionable bidirectional roller assemblies each including a plurality of bidirectional wheels that rotate both in a conveyor transport direction and in a diversion direction, and a first and a second hub assembly each having a reversibly compressible shaft to facilitate a repositioning of the bidirectional roller assembly within the roller conveyor; and a roller shaft having a first roller shaft end in connection with the first hub assembly and a second roller shaft end in connection with the second hub assembly.

20. The roller conveyor according to claim 19, wherein the roller conveyor includes from about six to about eighteen of the repositionable bidirectional roller assemblies.

21. The roller conveyor according to claim 19, further comprising a plurality of unidirectional rollers, with each of the plurality of bidirectional wheels having an overall diameter that is larger than a diameter of each of the plurality of unidirectional rollers.

22. A method of reconfiguring a unidirectional roller conveyor to include therein a plurality of repositionable bidirectional roller assemblies, said method comprising the steps of:

removing a plurality of unidirectional roller assemblies from the roller conveyor; and inserting therein a corresponding plurality of the repositionable bidirectional roller assemblies each including a plurality of bidirectional wheels that rotate both in a conveyor transport direction and in a diversion direction, a first and a second hub assembly each having a reversibly compressible shaft to facilitate the repositioning of the bidirectional roller assembly within the roller conveyor, and a roller shaft having a first roller shaft end in connection with the first hub assembly and a second roller shaft end in connection with the second hub assembly.

23. A repositionable bidirectional roller assembly for use in a roller conveyor, said repositionable bidirectional roller assembly comprising:

a plurality of rotatable bidirectional wheels;

a first and a second hub assembly each having a reversibly compressible hub assembly shaft to facilitate a repositioning of the bidirectional roller assembly within the roller conveyor; and a roller shaft having a first roller shaft end in connection with the first hub assembly and a second roller shaft end in connection with the second hub assembly, each of the plurality of rotatable bidirectional wheels being configured to provide rotation for transport of a conveyed item in a conveyor transport direction, and to provide rotation for transport of a conveyed item in a diversion direction.

24. The repositionable bidirectional roller assembly according to claim 23, wherein the diversion direction is different from the conveyor transport direction.

* * * * *